United States Patent
Carralero et al.

(10) Patent No.: US 11,742,502 B2
(45) Date of Patent: Aug. 29, 2023

(54) FUEL CELL POWER SYSTEM FOR AN UNMANNED SURFACE VEHICLE

(71) Applicants: The Boeing Company, Chicago, IL (US); Liquid Robotics, Inc., Sunnyvale, CA (US)

(72) Inventors: Michael A. Carralero, Huntington Beach, CA (US); Jeffrey Scott Willcox, Arlington, MA (US)

(73) Assignee: The Boeing Company, Chicago, IL (US)

(*) Notice: Subject to any disclaimer, the term of this patent is extended or adjusted under 35 U.S.C. 154(b) by 38 days.

(21) Appl. No.: 17/240,544

(22) Filed: Apr. 26, 2021

(65) Prior Publication Data
US 2021/0249671 A1    Aug. 12, 2021

Related U.S. Application Data

(62) Division of application No. 15/640,962, filed on Jul. 3, 2017, now Pat. No. 11,031,613.

(51) Int. Cl.
*H01M 8/04007* (2016.01)
*B63H 21/00* (2006.01)
(Continued)

(52) U.S. Cl.
CPC ........ *H01M 8/04216* (2013.01); *B63H 21/00* (2013.01); *B63H 21/38* (2013.01);
(Continued)

(58) Field of Classification Search
CPC ......... H01M 8/04216; H01M 8/04014; H01M 8/04029; H01M 8/04179; H01M 8/04358;
(Continued)

(56) References Cited

U.S. PATENT DOCUMENTS

| 5,372,617 A | 12/1994 | Kerrebrock et al. |
| 6,380,637 B1 | 4/2002 | Hsu et al. |

(Continued)

FOREIGN PATENT DOCUMENTS

| CN | 1534817 A | 10/2004 |
| CN | 101911356 A | 12/2010 |

(Continued)

OTHER PUBLICATIONS

Notice of Allowance, U.S. Appl. No. 15/640,962, dated Jan. 25, 2020.

(Continued)

*Primary Examiner* — James Lee
(74) *Attorney, Agent, or Firm* — Vivacqua Crane PLLC

(57) ABSTRACT

A power system for an unmanned surface vehicle includes a fuel cell including a fuel cell stack, where the fuel cell stack includes a fuel inlet. The power system also includes a fuel storage including at least one fuel-storage module fluidly connected to the fuel inlet of the fuel cell stack. The fuel-storage module is a source of energy for the fuel cell. The power system also includes a fuel and thermal management system fluidly connected to the fuel inlet of the fuel cell stack. The fuel and thermal management system includes a heat exchanger in thermal communication with the fuel cell stack for removing waste heat produced by the fuel cell stack during operation. The fuel and thermal management system also includes a flow valve, a pressure regulator, and a conduit.

20 Claims, 27 Drawing Sheets

(51) Int. Cl.
*B63H 21/38* (2006.01)
*H01M 8/04082* (2016.01)
*H01M 8/04492* (2016.01)
*H01M 8/0432* (2016.01)
*H01M 8/04029* (2016.01)
*H01M 8/04992* (2016.01)
*H01M 8/04119* (2016.01)
*H01M 8/04537* (2016.01)
*H01M 8/04014* (2016.01)
*H01M 8/065* (2016.01)
*H01M 8/04223* (2016.01)
*H01M 8/04291* (2016.01)
*H01M 8/04225* (2016.01)
*B63B 35/00* (2020.01)

(52) U.S. Cl.
CPC ... *H01M 8/04007* (2013.01); *H01M 8/04014* (2013.01); *H01M 8/04029* (2013.01); *H01M 8/04067* (2013.01); *H01M 8/04074* (2013.01); *H01M 8/04156* (2013.01); *H01M 8/04164* (2013.01); *H01M 8/04179* (2013.01); *H01M 8/04201* (2013.01); *H01M 8/04225* (2016.02); *H01M 8/04231* (2013.01); *H01M 8/04268* (2013.01); *H01M 8/04291* (2013.01); *H01M 8/04358* (2013.01); *H01M 8/04373* (2013.01); *H01M 8/04522* (2013.01); *H01M 8/04626* (2013.01); *H01M 8/04992* (2013.01); *H01M 8/065* (2013.01); *B63B 2035/006* (2013.01); *B63H 2021/003* (2013.01); *H01M 2250/20* (2013.01)

(58) Field of Classification Search
CPC ......... H01M 8/04373; H01M 8/04992; H01M 8/065; H01M 2250/20; B63H 21/00; B63H 21/38
See application file for complete search history.

(56) References Cited

U.S. PATENT DOCUMENTS

| | | | |
|---|---|---|---|
| 2002/0009623 | A1 | 1/2002 | St-Pierre et al. |
| 2003/0091876 | A1* | 5/2003 | Rusta-Sellehy ... H01M 8/04201 429/421 |
| 2005/0039958 | A1 | 2/2005 | Tartamella et al. |
| 2010/0055517 | A1* | 3/2010 | Uzhinsky ............ H01M 8/0606 422/162 |
| 2010/0310955 | A1 | 12/2010 | Yadha et al. |
| 2011/0039169 | A1 | 2/2011 | Cleland |
| 2011/0257819 | A1 | 10/2011 | Chen et al. |
| 2012/0148927 | A1 | 6/2012 | Jeon et al. |
| 2015/0338260 | A1* | 11/2015 | Stimits ............... H01M 8/04373 429/515 |
| 2016/0006063 | A1* | 1/2016 | Knight ............... H01M 8/04014 429/425 |
| 2017/0179508 | A1 | 6/2017 | Takahashi et al. |
| 2017/0352896 | A1* | 12/2017 | Braillard ........... H01M 8/04029 |

FOREIGN PATENT DOCUMENTS

| | | |
|---|---|---|
| CN | 102569848 A | 7/2012 |
| EP | 1956672 A1 | 8/2008 |
| JP | 49-003303 U | 1/1974 |
| JP | 2002056871 A | 2/2002 |
| JP | 2006221993 A | 8/2006 |
| JP | 2008189538 A | 8/2008 |
| KR | 20150100177 A | 9/2015 |

OTHER PUBLICATIONS

Non-Final Office Action, U.S. Appl. No. 15/640,962, dated Oct. 14, 2020.
Final Office Action, U.S. Appl. No. 15/640,962, dated Mar. 23, 2020.
Non-Final Office Action, U.S. Appl. No. 15/640,962, dated Aug. 21, 2019.
Chinese Patent Office (CNIPA). Office Action for CN Application No. 2018107133553, dated Aug. 23, 2022, pp. 1-12.
Japanese Patent Office. Office Action for JP Application No. 2018-122575, dated Jun. 28, 2022, pp. 1-6.

* cited by examiner

FUEL CELL POWER SYSTEM FOR AN UNMANNED SURFACE VEHICLE

CROSS-REFERENCE TO RELATED APPLICATIONS

This application is a divisional of U.S. application Ser. No. 15/640,962 filed on Jun. 3, 2017.

FIELD

The disclosed system relates to a power system for an unmanned surface vehicle and, more particularly, to a power system that includes a fuel cell and fuel storage that is a source of energy for the fuel cell.

BACKGROUND

An unmanned surface vehicle, which may also be referred to as an autonomous surface vehicle, operates on the surface of a body of water. Unmanned surface vehicles may be used for exploration, long-term monitoring, civilian and defense security applications, and surveillance and reconnaissance, and are sometimes employed in harsh conditions as well as remote areas of the ocean. Accordingly, unmanned surface vehicles require high-energy power sources capable of supporting missions for a long duration of time. For example, some types of unmanned surface vehicles may conduct surveys across vast expanses of the ocean for up to one year.

Energy devices such as batteries, solar power, or internal combustion engines are typically used as an energy device to provide power to the unmanned surface vehicle during operation. However, these energy devices may have drawbacks, or are unable to provide the energy required to operate the unmanned surface vehicle for long periods of time. Batteries lack sufficient energy density to provide the energy needed for a mission having a long duration. Furthermore, solar cells may not be a viable optional as well, since there is a reduction of solar irradiance at higher latitudes during winter. Internal combustion engines are easy to refuel and have a quick turn-around time. However, internal combustion engines are complex mechanisms that require routine maintenance, and have constraints that limit their utility for long-duration, unattended operation. Internal combustion engines also create significant acoustic noise, and undesirable circumstance for many unmanned surface vehicle missions.

SUMMARY

In one example, a power system for an unmanned surface vehicle includes a fuel cell including a fuel cell stack, where the fuel cell stack includes a fuel inlet. The power system also includes a fuel storage including at least one fuel-storage module fluidly connected to the fuel inlet of the fuel cell stack. The fuel-storage module is a source of energy for the fuel cell. The power system also includes a fuel and thermal management system fluidly connected to the fuel inlet of the fuel cell stack. The fuel and thermal management system includes a heat exchanger in thermal communication with the fuel cell stack for removing waste heat produced by the fuel cell stack during operation. The fuel and thermal management system also includes a flow valve, a pressure regulator, and a conduit. The conduit fluidly connects the fuel storage to the fuel cell stack, and the flow valve and the pressure regulator are both located along the conduit.

In another example, a method of delivering fuel to and removing reaction waste heat from a fuel cell stack of a fuel cell by a fuel and thermal management system is disclosed. The method includes fluidly connecting a fuel storage including at least one fuel-storage module to a fuel inlet of the fuel cell stack of the fuel cell, where the fuel-storage module is a source of energy for the fuel cell. The method also includes removing waste heat produced by the fuel cell stack by a heat exchanger in thermal communication with the fuel cell stack. The method also includes fluidly connecting the fuel storage to the fuel cell stack by a conduit, where a flow valve and a pressure regulator are both located along the conduit. The method also includes delivering fuel from the fuel storage to the fuel cell stack by the conduit.

Other objects and advantages of the disclosed method and system will be apparent from the following description, the accompanying drawings and the appended claims.

DETAILED DESCRIPTION

Figure 1:
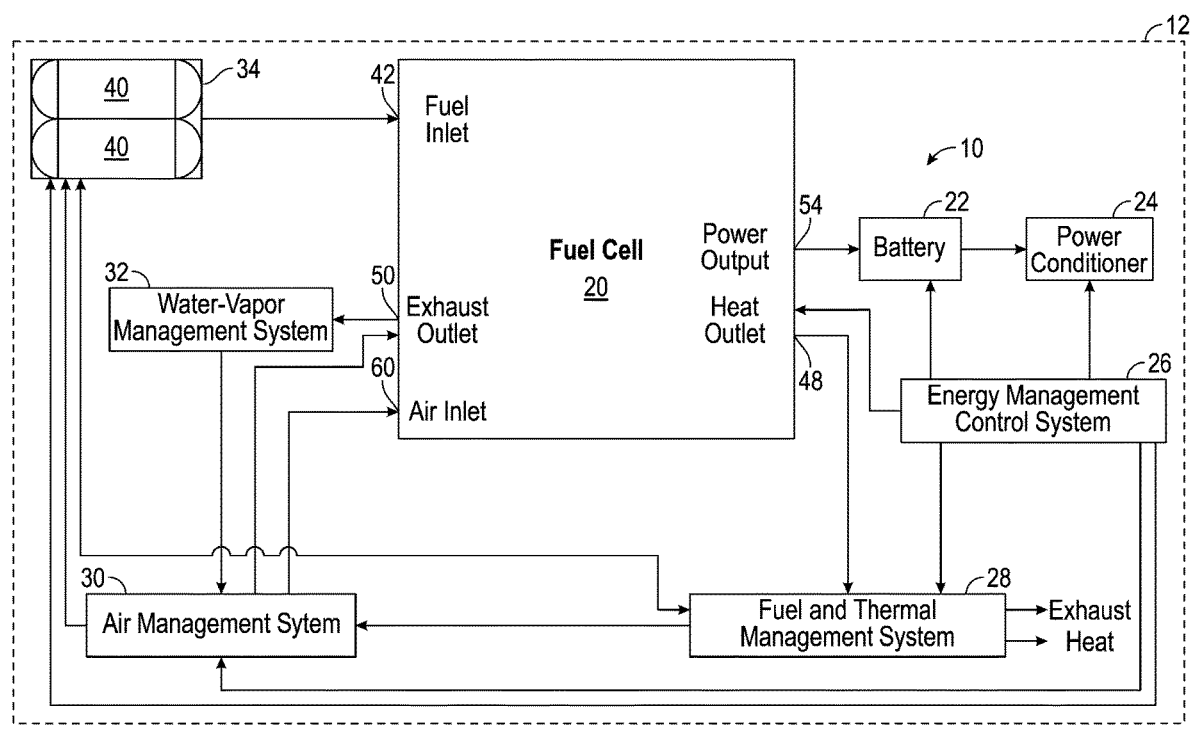
FIG. 1 is an exemplary schematic block diagram of the disclosed power system for an unmanned surface vehicle, where the power system includes a fuel cell and a fuel storage.

FIG. 1 is an exemplary schematic block diagram of the disclosed power system 10 for an unmanned surface vehicle 12. The power system 10 includes a fuel cell 20, a battery 22, a power conditioner 24, an energy management control system 26, a fuel and thermal management system 28, an air management system 30, a water-vapor management system 32, and a fuel storage 34. In the embodiment as shown, multiple fuel-storage modules 40 are fluidly connected to a fuel inlet 42 of the fuel cell 20. The fuel storage 34 accommodates refueling of the power system 10, without the need to remove elements or open enclosures included within the power system 10. The fuel storage 34 is a source of energy for the fuel cell 20, and allows for the power system 10 to provide the energy required to operate the unmanned surface vehicle 12, especially during long duration missions. In one exemplary embodiment, a mission having a long duration lasts up to one year.

Figure 13A:
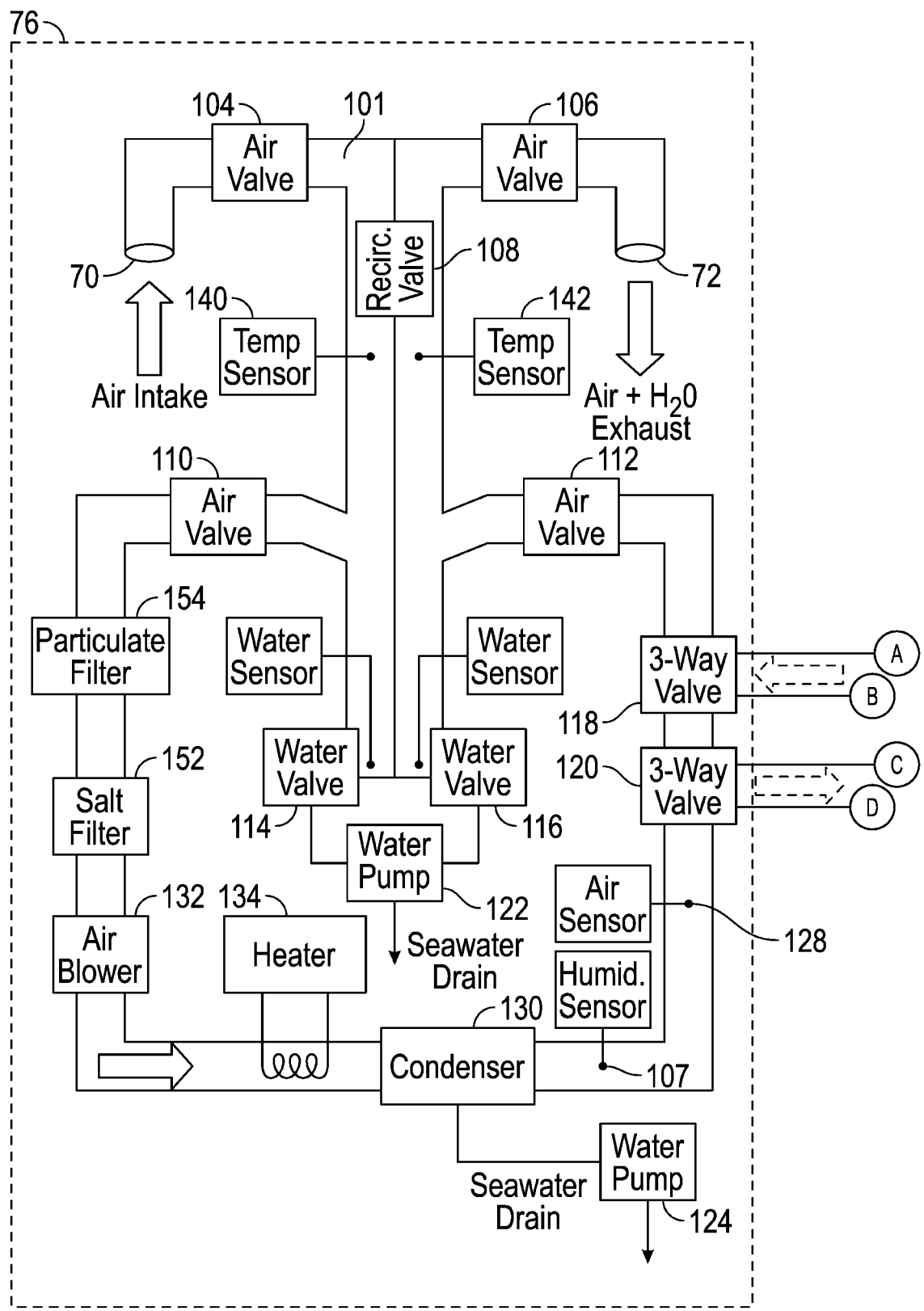
FIGS. 13A-13B are an illustration of the fuel and thermal management system preheating hydrogen fuel stored in the fuel storage.
Figure 13B:
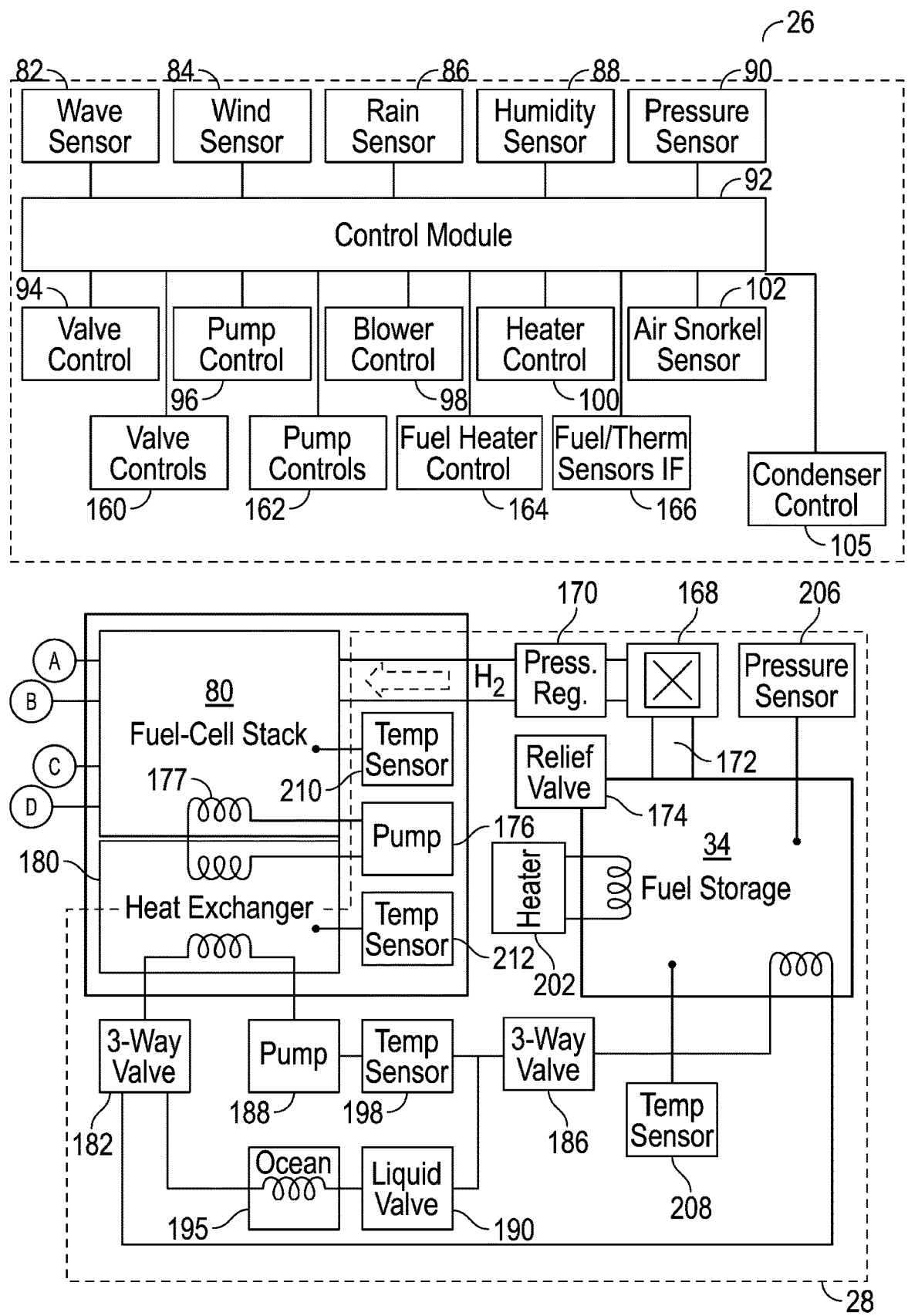

In the embodiment as described, the fuel storage 34 is a scalable metal-hydride fuel storage substrate. However, in an alternative embodiment the fuel storage 34 contains gaseous hydrogen, cryogenic liquid hydrogen, or other hydrogen-dense gaseous and liquid fuels such as propane, methanol, and propanol. In fact, the fuel storage 34 may contain any hydrogen bearing molecule with high fraction of hydrogen by molecular weight such as methanol, propanol, and propane. However, the heating the fuel storage substrate, which is described below and shown in FIGS. 13A-13B, is only applicable to metal-hydride fuels. The fuel cell 20 produces the energy required to operate the unmanned surface vehicle 12. In addition to energy, the fuel cell 20 also produces water vapor and heat as byproducts. Accordingly, the fuel cell 20 includes a heat outlet 48 and an exhaust outlet 50 to remove the byproducts. As seen in FIG. 1, the exhaust outlet 50 and the heat outlet 48 are both fluidly connected to the fuel and thermal management system 28. The fuel cell 20 sends exhaust gases to the fuel and thermal management system 28 through the exhaust outlet 50. Similarly, the fuel cell 20 sends heat to the fuel and thermal management system 28 through the heat outlet 48. The fuel and thermal management system 28 dissipates the exhaust to the air and the heat directly to the water (not illustrated) surrounding the unmanned surface vehicle 12. For example, the unmanned surface vehicle 12 may dissipate heat into surrounding seawater and water vapor and heated air into the surrounding air.

The fuel cell 20 includes an electrical power output 54 connected to the battery 22. The battery 22 is recharged by the energy provided by the electrical power output 54 of the fuel cell 20. The battery 22 is a rechargeable battery that may be charged and discharged multiple times. The battery 22 is also connected to the energy management control system 26 and the power conditioner 24. The power conditioner 24 is a DC-to-DC converter that converts direct current from one voltage level to another voltage level.

Figure 2A:
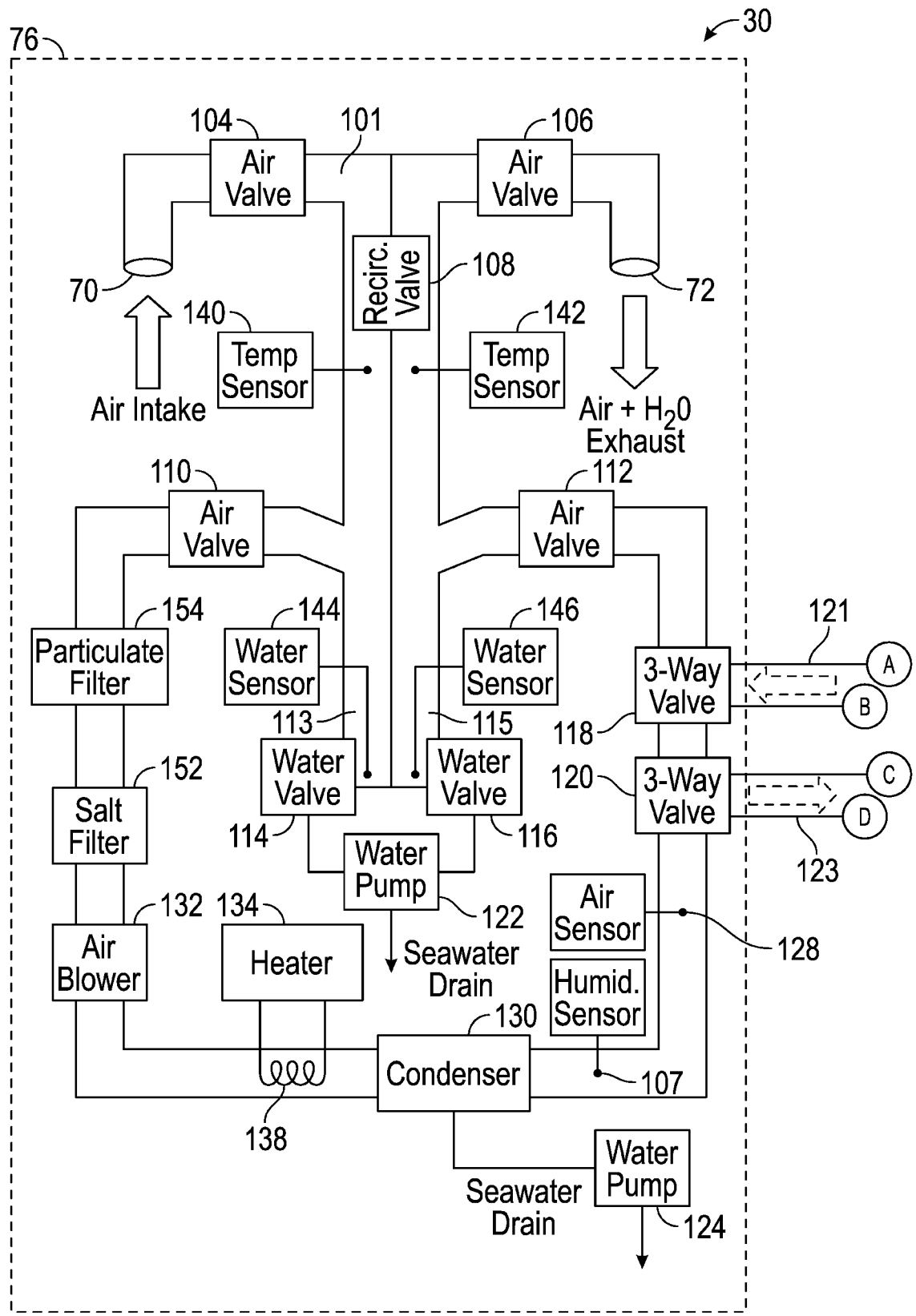
FIGS. 2A-2B are a detailed schematic block diagram of the power system shown in FIG. 1 including a fuel cell stack of the fuel cell, an air management system having an air snorkel subsystem, a control system, and a fuel and thermal management system.
Figure 2B:
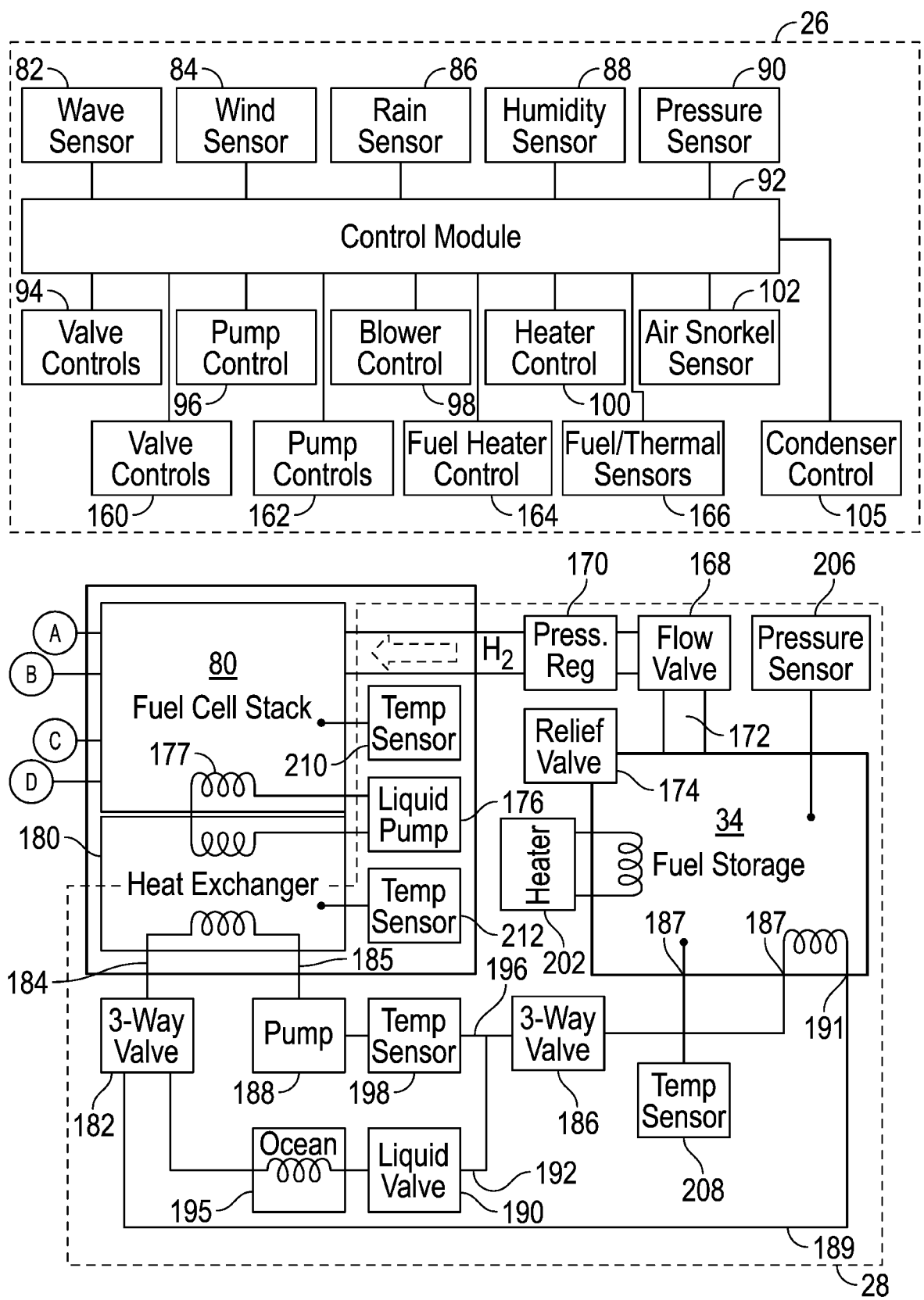

The air management system 30 supplies air to the fuel cell 20 through an air inlet 60. The fuel cell 20 is fluidly connected to the water-vapor management system 32 at the exhaust outlet 50, where water is expelled from the fuel cell 20 through the exhaust outlet 50 and to the water-vapor management system 32. The water-vapor management system 32 utilizes the air management system 30 to improve a water balance coefficient of the fuel cell 20. A more detailed view of the air management system 30 is illustrated in FIGS. 2A-2B. Referring now to both FIGS. 1 and 2, the air management system 30 includes an air intake 70 and an exhaust 72 that are part of an air snorkel 76. The air intake 70 receives ambient air, and the exhaust expels air and exhaust water created by the fuel cell 20. As seen in FIGS. 2A-2B, the air management system 30 supplies air to a fuel cell stack 80, which is part of the fuel cell 20. Specifically, the air intake 70 receives air that is supplied to the fuel cell stack 80, and exhausted air and exhausted water-vapor created by the fuel cell stack 80 are expelled from the power system 10 (FIG. 1) though the exhaust 72. FIGS. 2A-2B also illustrates the energy management control system 26 and the fuel and thermal management system 28.

Continuing to refer to FIGS. 2A-2B, the energy management control system 26 monitors a plurality of environmental condition sensors. In the embodiment as shown, the environmental condition sensors include a wave sensor 82 for indicating a sea state, a wind sensor 84 for indicating wind speed, a rain sensor 86 for indicating precipitation, an ambient humidity sensor 88 for indicating ambient air humidity, and a pressure sensor 90 to indicate ambient air pressure. In one embodiment, the sea state may include parameters such as, but not limited to, wave height, wave period and wave direction, and instantaneous platform attitude angles (roll, pitch, and yaw). The energy management control system 26 monitors the sensors 82, 84, 86, 88, 90, and makes a decision to continue or terminate operation of the power system 10 based on the sea state and weather conditions. For example, the energy management control system 26 monitors the sea state to ensure that the air snorkel 76 is not over-washed by seawater. The energy management control system 26 also monitors instantaneous platform attitude for extreme angle conditions that may indicate excessive instantaneous wave conditions. In an embodiment, an intake valve 104 and exhaust valve 106 are temporarily closed to substantially prevent water ingress from infrequent instance of wave over-wash of the unmanned surface vehicle 12. In the embodiment as shown in FIGS. 2A-2B, the air snorkel 76 includes a conduit 101 for transporting air throughout the air snorkel 76. Specifically, ambient air enters the conduit 101 through the air intake 70 and air and water exhaust exit the conduit 101 through the exhaust 72.

The sensors 82, 84, 86, 88, 90 are each in communication with a control module 92. The control module 92 receives as input signals indicative of the sea state from the wave sensor 82, the wind speed from the wind sensor 84, the precipitation from the rain sensor 86, air humidity from the ambient humidity sensor 88, and air pressure from the pressure sensor 90. The control module 92 may refer to, or be part of, an application specific integrated circuit (ASIC), an electronic circuit, a combinational logic circuit, a field programmable gate array (FPGA), a processor (shared, dedicated, or group) comprising hardware or software that executes code, or a combination of some or all of the above, such as in a system-on-chip. The control module 92 monitors the sensors 82, 84, 86, 88, 90 for the sea state and weather conditions.

In addition to monitoring the sea state and the weather conditions, the control module 92 also monitors and controls the air snorkel 76 and the fuel and thermal management system 28. The control module 92 is in communication with or includes valve controls 94, pump controls 96, a blower control 98, a heater control 100, and air snorkel sensors 102 of the air snorkel 76. The control module 92 sends a signal to the valve controls 94 to control a plurality of valves that are part of the air snorkel 76. Specifically, the air snorkel 76 includes the air intake valve 104 that is fluidly connected to the air intake 70, the exhaust valve 106 fluidly connected to the exhaust 72, a recirculation valve 108, air valves 110, 112, water valves 114, 116, and three-way diverting valves 118, 120. The water valves 114, 116 are located in respective sumps 113, 115. The sumps 113, 115 collect water that enters the conduit 101 through the air intake 70 and exhaust 72, respectively. The recirculation valve 108 is a variable flow valve located along the conduit 101, and is for mixing the ambient air entering the air intake 70 with the air expelled from the exhaust 72. The recirculation valve 108 includes a fully opened position, a fully closed position, and a plurality of variable positions between the fully opened and closed positions.

As seen in FIGS. 2A-2B, the three-way diverting valves 118, 120 fluidly connect the air snorkel 76 to the fuel cell stack 80. Specifically, the three-way diverting valve 120 fluidly connects the air snorkel 76 to the fuel cell stack 80 to an inlet conduit 123. The inlet conduit 123, which corresponds to the exhaust outlet 50 of the fuel cell 20 in FIG. 1, is a passage that allows for water-vapor and exhaust created by the fuel cell stack 80 to enter the air snorkel 76. The three-way diverting valve 118 fluidly connects to an outlet conduit 121. The outlet conduit 121, which corresponds to the air inlet 60 shown in FIG. 1, creates a passage for intake or ambient air to enter into to the fuel cell stack 80. The air snorkel 76 is a device that provides air to operate the fuel cell 20 while the unmanned surface vehicle 12 (FIG. 1) is deployed on a surface of a body of water.

The pump controls 96 are for the control of various pumps that are part of the air snorkel 76. In the embodiment as shown in FIGS. 2A-2B, the air snorkel 76 includes a water pump 122 fluidly connected to the water valves 114, 116 by the conduit 101. When the water valves 114, 116 are opened and the water pump 122 is activated, the water collected within the sumps 113, 115 is purged and drained to seawater. The air snorkel 76 also includes a water pump 124 fluidly connected to a condenser 130. As explained below, the condenser 130 condenses any water vapor carried by the air traveling through the conduit 101, and the water pump 124 purges the condensed water collected by the condenser 130 from the air snorkel 76 to seawater.

The blower control 98 is used to monitor and control an air blower 132. The air blower 132 circulates forced air throughout the conduit 101 when activated, and is situated upstream of the condenser 130. The blower control 98 monitors the air flow sensor 128 and adjusts the speed of the air blower 132 to achieve a target air flow rate. The heater control 100 monitors and controls a heater 134. The heater 134 is located upstream of the condenser 130 and downstream of the air blower 132. The heater 134 elevates the temperature of the forced air circulated by the air blower 132. In the exemplary embodiment as shown, the heater 134 includes a heating element 138 located within the conduit 101 for heating air. However, other types of heating devices that heat the air within the conduit 101 may be used as well. The condenser control 105 monitors a humidity sensor to control the condenser 130 to remove water vapor from the air for the fuel-cell water purge cycle.

Finally, the air snorkel sensors 102 are for monitoring and controlling the various sensors located within the conduit 101 of the air snorkel 76. In the embodiment as shown in FIGS. 2A-2B, the air snorkel 76 includes a temperature sensor 140 downstream of the air intake 70, a temperature sensor 142 downstream of the exhaust 72, a water sensor 144 to monitor the sump 113, and a water sensor 146 to monitor the sump 115. The air snorkel 76 also includes a salt filter 152 and a particulate filter 154, which are both upstream of the air blower 132. The salt filter 152 removes salt and the particulate filter 154 removes contaminates from the air traveling through the conduit 101.

As explained in greater detail below, the air snorkel 76 substantially prevents seawater and rainwater intrusion into the fuel cell stack 80. The air snorkel 76 also provides a preheat function for the fuel cell stack 80 based on the power system 10 (FIG. 1) starting at extremely cold conditions. In one exemplary embodiment, the extremely cold conditions include ambient temperatures of about 5° C. and below. The air snorkel 76 also delivers oxygen (O2) to the fuel cell stack 80. The air snorkel 76 provides an ice prevention feature. Specifically, the fuel cell stack 80 is purged of water-vapor in response to the fuel cell stack 80 experiencing the cold conditions during non-use, which in turn substantially prevents ice formation in the fuel cell stack 80. Finally, the air snorkel 76 also removes waste heat created by the operation of the fuel cell stack 80.

Continuing to refer to FIGS. 2A-2B, the control module 92 is in communication with valve controls 160, pump controls 162, a fuel heater control 164, and fuel and thermal sensors control 166 of the fuel and thermal management system 28. The valve controls 160 are for monitoring and controlling a plurality of valves that are part of the fuel and thermal management system 28. In the embodiment as shown in FIGS. 2A-2B, the fuel and thermal management system 28 includes a flow valve 168, a pressure regulator 170, and a conduit 172 for transporting fuel, and a relief valve 174. The conduit 172 fluidly connects the fuel storage 34 to the fuel cell stack 80, and the flow valve 168 and the pressure regulator 170 are both located along the conduit 172.

As seen in FIGS. 2A-2B, a heat exchanger 180 is in thermal communication with the fuel cell stack 80, and is for removing waste heat produced by the fuel cell stack 80 during operation. A primary pump 176 of the heat exchanger 180 circulates coolant flowing within a primary circuit 177 between the fuel cell stack 80 and the heat exchanger 180. A secondary pump 188 of the heat exchanger 180 circulates coolant in a secondary circuit 189 between the fuel storage 34 and the heat exchanger 180. The secondary pump 188 is a variable displacement pump that varies the coolant flow between the heat exchanger 180 and the fuel storage 34. The fuel and thermal management system 28 includes a three-way valve 182 fluidly connected to the heat exchanger 180 and a three-way valve 186 fluidly connected to the fuel storage 34. A temperature sensor 198 monitors the temperature of coolant flowing between the fuel storage 34 and the heat exchanger 180 within a conduit 196. A liquid valve 190 is also located in a diverter conduit 192. The liquid valve 190 is opened in order to allow coolant to flow through the diverter conduit 192. The coolant is then cooled by a water-cooled heat exchanger 195. In water-cooled heat exchanger 195 is cooled by a body of water in which the unmanned surface vehicle 12 (FIG. 1) is deployed. For example, the water-cooled heat exchanger may be cooled by an ocean's water.

The fuel heater control 164 is for monitoring and controlling a heater 202. The heater 202 is in thermal communication with and heats the fuel contained within the fuel storage 34. Finally, the fuel and thermal sensors control 166 is for monitoring and controlling various sensors of the fuel and thermal management system 28. Specifically, the fuel and thermal management system 28 includes a pressure sensor 206 and a temperature sensor 208 for monitoring the fuel storage 34. The fuel and thermal management system 28 also includes a temperature sensor 210 for monitoring the temperature of the fuel cell stack 80 and a temperature sensor 212 for monitoring the temperature of the heat exchanger 180.

As explained in greater detail below, the fuel and thermal management system 28 delivers fuel, which is hydrogen ($H_2$), to the fuel cell stack 80 through the conduit 172. In the event the fuel storage 34 stores metal hydride, then waste heat created by the fuel cell stack 80 is used to catalyze the production of hydrogen. The fuel and thermal management system 28 also substantially eliminates reaction waste heat from the fuel cell stack 80, thereby providing cooling.

Figure 3A:
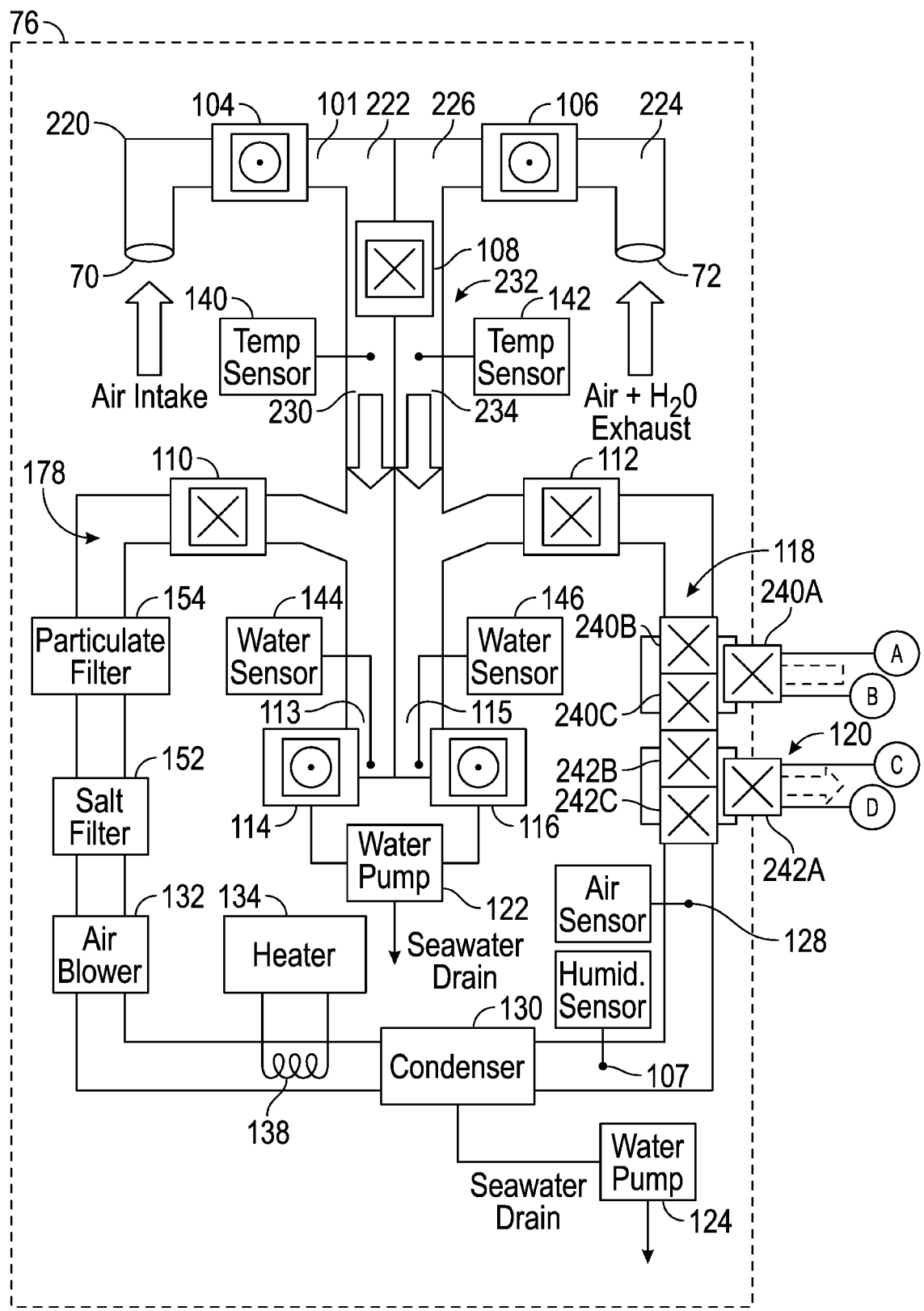
FIGS. 3A-3B are an illustration of the air snorkel subsystem purging ingested water.
Figure 3B:
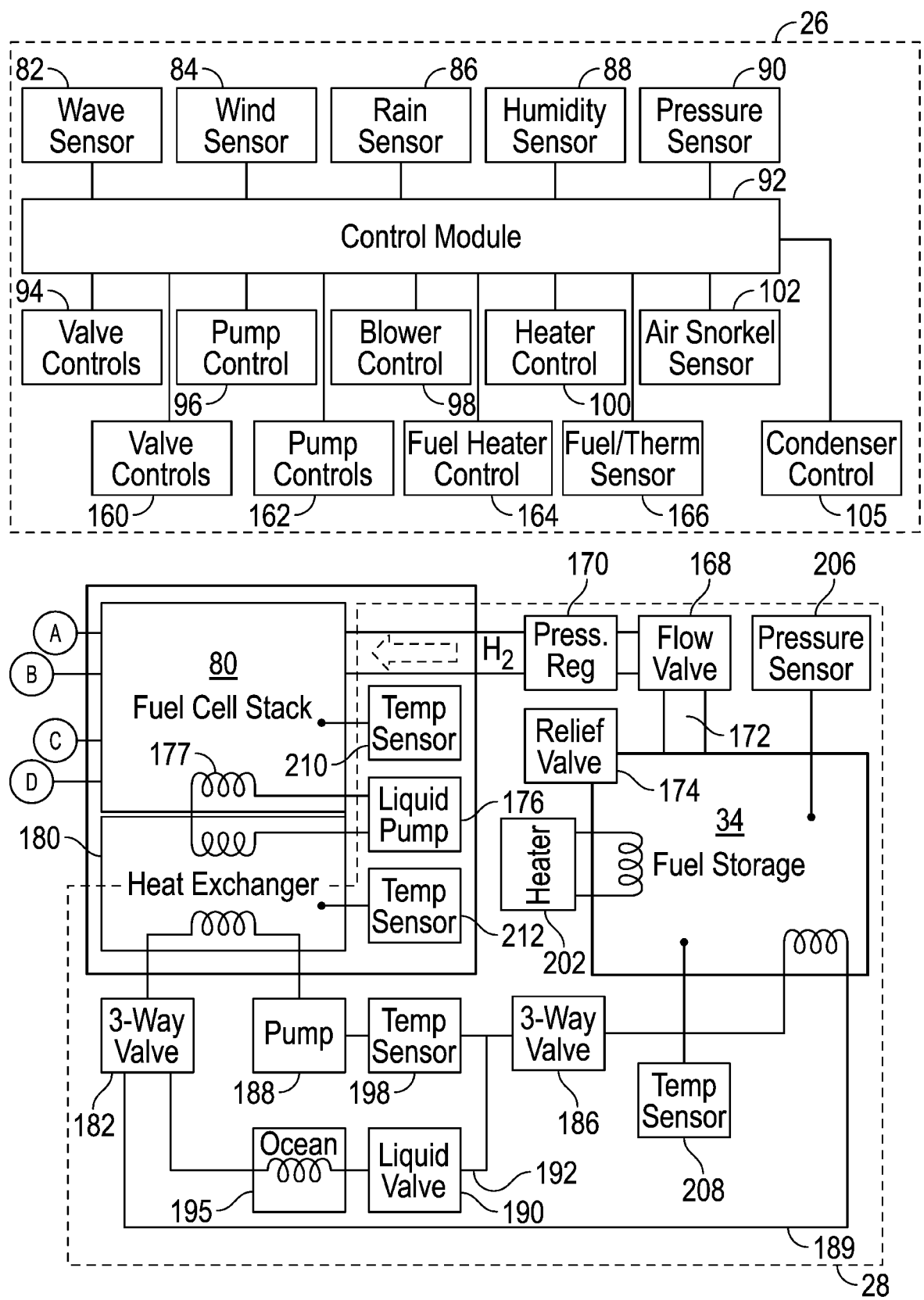

FIGS. 3A-3B are an illustration of the air snorkel 76 operating in a water purge mode to remove any water residing within the sumps 113, 115 of the conduit 101. In the embodiments as shown, an "O" indicates that a valve is open, and a "X" indicates that a particular valve has been closed. As seen in the figures, the conduit 101 of the air snorkel 76 is bent to define two bends 220, 222 directly adjacent to the air intake 70. The bends 220, 222 are bent in opposing directions. In the embodiment as shown, both bends 220, 222 are bent at substantially ninety degree angles. The conduit 101 is also bent to define two bends 224, 226 directly adjacent to the exhaust 72. The bends 224, 226 are also bent in opposing directions, and at substantially ninety degree angles. The bent configuration of the conduit 101 at the air intake 70 and the exhaust 72 substantially prevents the ingression of rain and seawater spray into the air snorkel 76 when the valves 104, 106 are open. Although FIGS. 3A-3B illustrates bends, other configurations and geometries may be used as well to substantially prevent water ingression such as, for example, a generally U-shaped bend (i.e., an arcuate portion with two relatively straight sides).

Although the conduit 101 includes the bent configuration to substantially prevent the intrusion of seawater, it is still possible for the air snorkel 76 to ingest seawater during high sea states. The control module 92 monitors the water sensors 144, 146 to determine the presence of water or other liquids in the respective sumps 113, 115. In response to determining the presence of water or other liquid within the sumps 113, 115, the control module 92 places the air snorkel 76 into the water purge mode, which purges the water collected within the sumps 113, 115.

The air valve 110, which is located downstream of the air intake valve 104 and the air intake 70, is a water-tight air valve and is placed into the closed position by the valve control 94, thereby substantially preventing the ingression of water into a main circuit 178 of the conduit 101 during the air purge mode. Specifically, the air valve 110 substantially prevent the ingression of water that passes through the air intake valve 104 and down an inlet side 230 of a main branch 232 of the conduit 101. Similarly, the air valve 112, which is located upstream of the exhaust valve 106 and the exhaust 72, is a water-tight air valve also placed into the closed position to substantially prevent the ingression of water into the main circuit 178 of the conduit 101 during the water purge mode. Specifically, the air valve 112 substantially prevents the ingression of water that passes through the exhaust valve 106, and travels down an exhaust side 234 of the main branch 232 of the conduit 101. The three-port valve 240 is a three-way diverting valve, where each port 240A, 240B, 240C of the three-port valve 240 is shut. Similarly, the three-way valve 242 is also a three-way diverting valve, where each port 242A, 242B, 242C is also shut. Finally, the water pump 122 connected to the valves 114, 116 is activated by the pump control 96 to thereby purge the water collected within the sumps 113, 115.

As seen in FIGS. 3A-3B, the conduit 101 defines both the sumps 113, 115, which are for collecting water. The water pump 122 is fluidly connected to both of the sumps 113, 115. During the water purge mode, the valve control 94 closes both of the valves 120, 240 connecting the air snorkel 76 with the fuel cell stack 80. The water collected within the sumps 113, 115 is removed by opening the air intake valve 104 and the exhaust valve 106, and then activating the water pump 122. The water pump 122 creates a suction within the conduit 101 of the air snorkel 76. The suction causes ambient air to be drawn into both of the air intake 70 and the exhaust 72.

Figure 4:
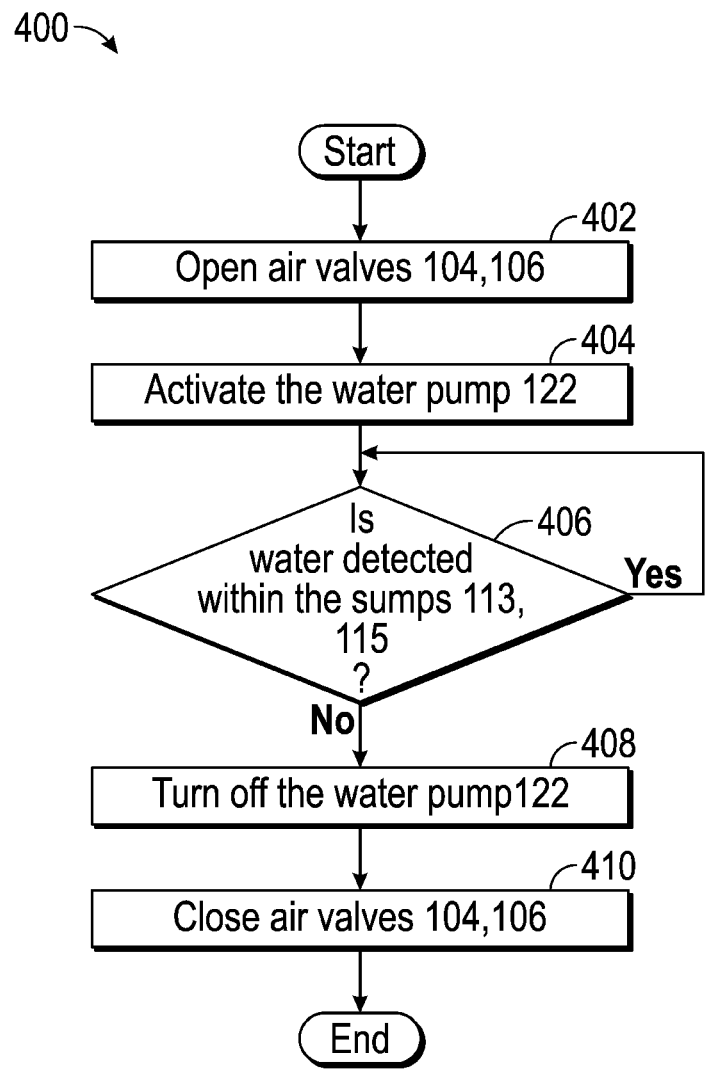
FIG. 4 is a process flow diagram of the air snorkel subsystem in FIG. 3 purging the ingested water.

The water purging operation is now explained. FIG. 4 is a process flow diagram illustrating a method 400 for purging the water collected within the sumps 113, 115 of the conduit 101 of the air snorkel 76. Referring now to both FIGS. 3 and 4, method 400 begins at block 402. In block 402, the air intake valve 104 directly adjacent to the air intake 70 and the exhaust valve 106 adjacent to the exhaust 72 are both opened. Once the valves 104, 106 are opened, then the method 400 proceeds to block 404. In block 404, the water pump 122 is activated. The method 400 then proceeds to decision block 406. In decision block 406, the control module 92 continuously monitors the water sensors 144, 146 until water is no longer detected within the sumps. Once there is no more water detected within the sumps 113, 115, the method 400 then proceeds to block 408. In block 408, the water pump 122 is turned off. The method may then proceed to block 410. In block 410, the air intake valve 104 directly adjacent to the air intake 70 and the exhaust valve 106 adjacent to the exhaust 72 are both closed. Method 400 then terminates.

Figure 5A:
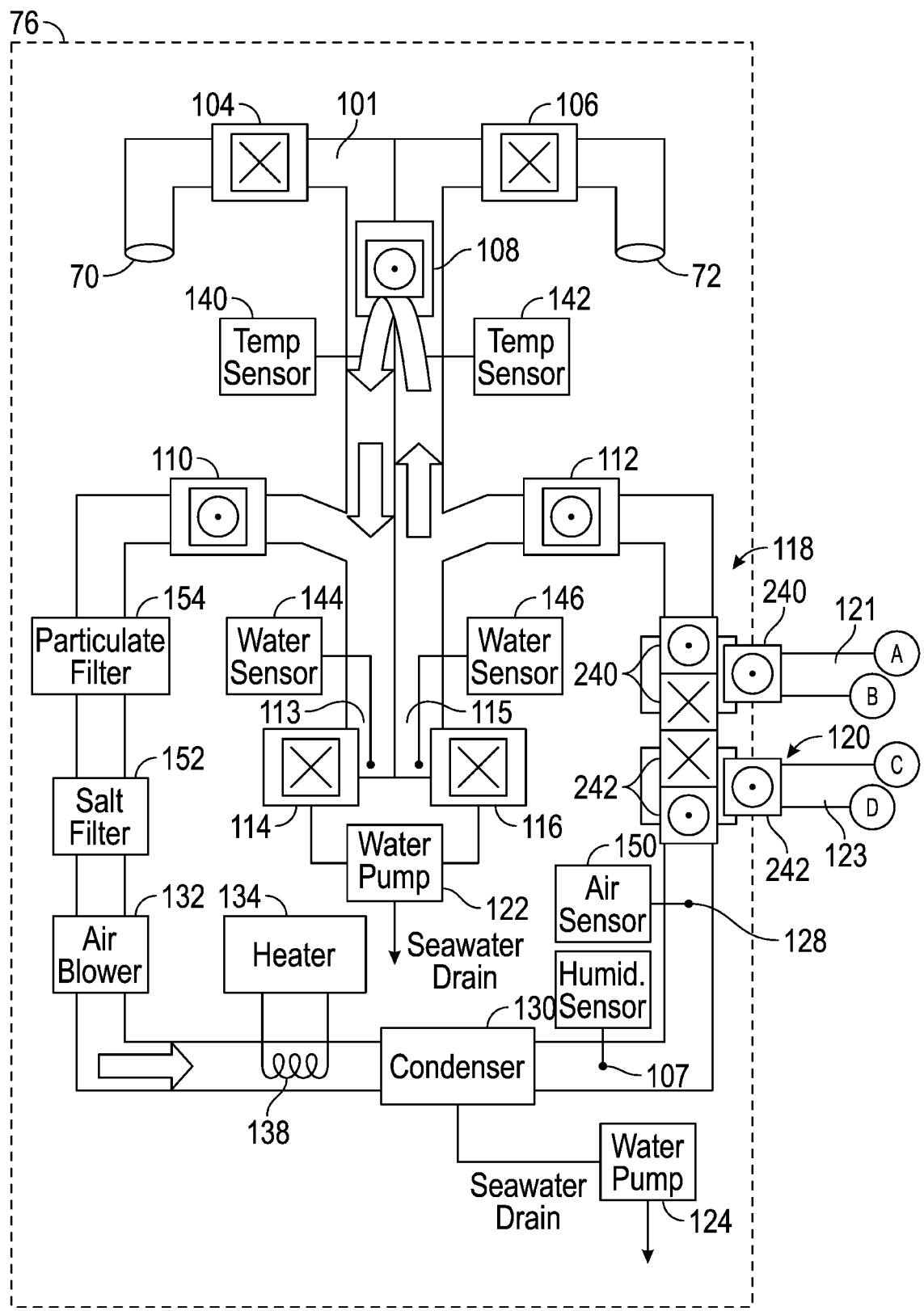
FIGS. 5A-5B are an illustration of the air snorkel subsystem preheating the fuel cell stack during cold temperatures.
Figure 5B:
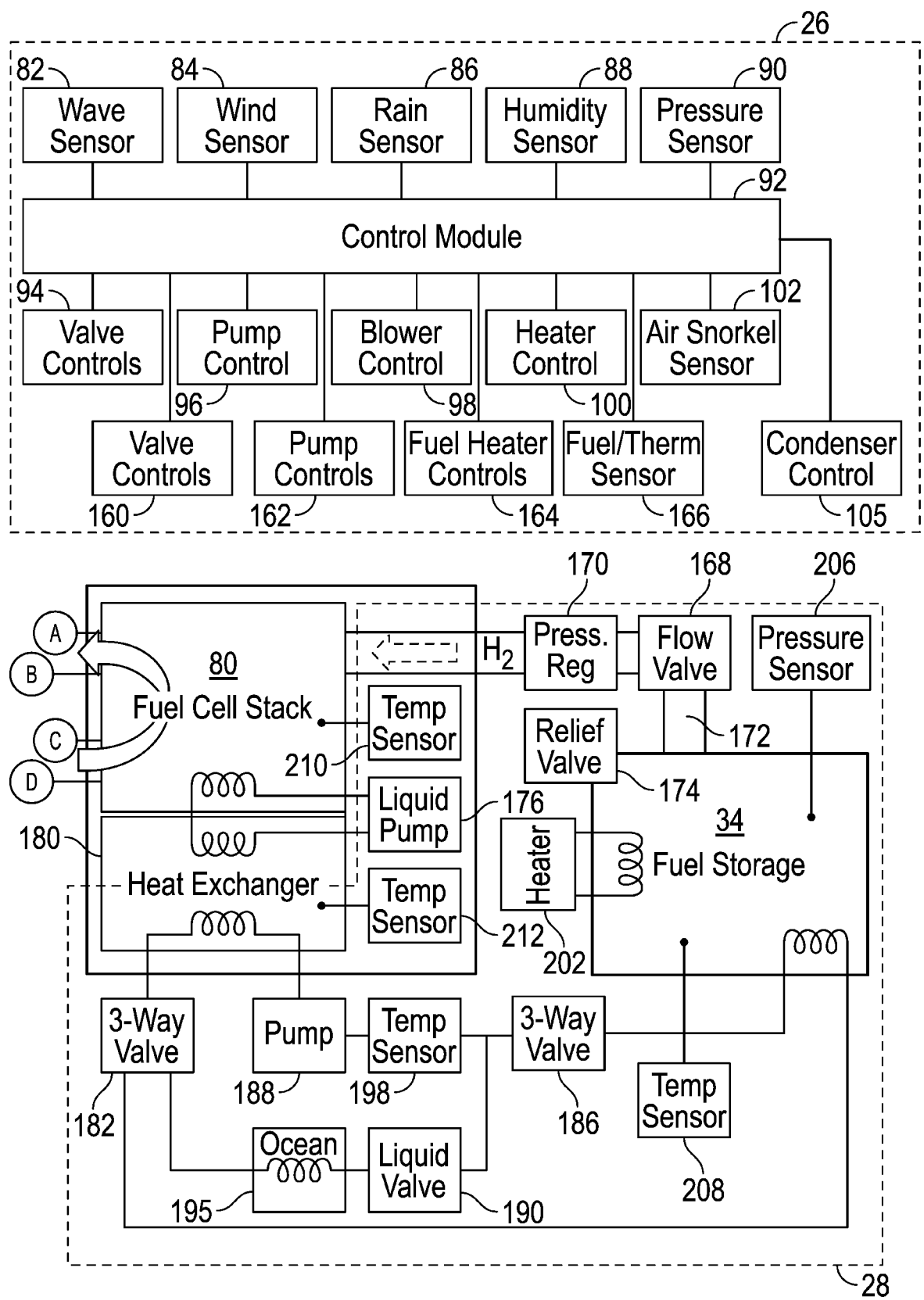

FIGS. 5A-5B are an illustration of the air snorkel 76 preheating the fuel cell stack 80 to a threshold temperature. In one exemplary embodiment, the threshold temperature is about 5° C. or below. The air snorkel 76 preheats the fuel cell stack 80 by closing the valves 104, 106, opening the recirculation valve 108, opening the air valves 110, 112, closing the water valves 114, 116, and activating both the air blower 132 and the heater 134. Also, the port 240A of the three-way diverting valve 118 located at the outlet conduit 121 and the port 240B located upstream of the air valve 112 are opened, and the remaining port 240C is in the closed position. Similarly, the port 242A of the three-way diverting valve 120 located at the inlet conduit 123 and the port 242B located downstream of the condenser 130 are both in the open position, and the remaining port 242C is in the closed position.

The air blower 132 is activated to circulate the forced air throughout the conduit 101, and the heater 134 is also activated to elevate the temperature of the forced air circulated by the air blower 132. The conduit 101 is fluidly connected to the fuel cell stack 80 by the inlet conduit 123, which corresponds to the air inlet 60 of the fuel cell 20 in FIG. 1, and the outlet conduit 121, which corresponds to the exhaust outlet 50 shown in FIG. 1. Thus, the forced air travels from the conduit 101 to the fuel cell stack 80 through the air inlet 60 (FIG. 1). The forced air warms the fuel cell stack 80 to a warm-up temperature. The warm-up temperature represents a minimum start-up temperature of the fuel cell stack 80.

Figure 6:
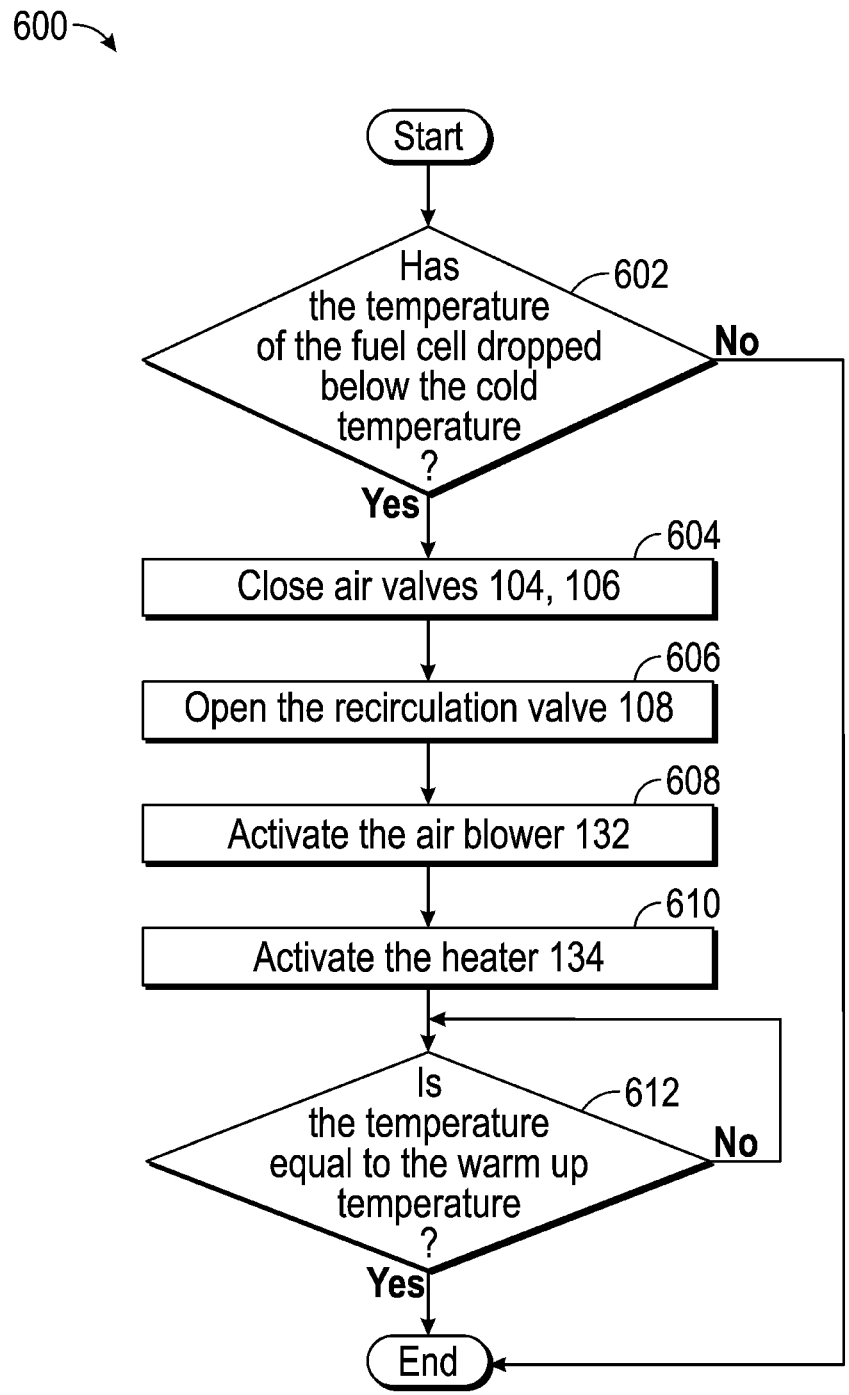
FIG. 6 is a process flow diagram of the air snorkel subsystem in FIGS. 5A-5B preheating the fuel cell stack.

FIG. 6 is a process flow diagram illustrating a method 600 for preheating the fuel cell stack 80 prior to fuel-cell startup if the fuel-cell temperature is below a minimum threshold for operation. In one embodiment, the method 600 is performed after the water purging as described above and illustrated in both FIGS. 3 and 4. Referring now to both FIGS. 5 and 6, method 600 begins at decision block 602. In decision block 602, the control module 92 checks the temperature sensor 210 to determine whether the temperature of the fuel cell stack 80 has dropped to or is below the threshold temperature. In response to the temperature of the fuel cell stack 80 being above the threshold temperature, the method 600 terminates. In response to the temperature of the fuel cell stack 80 being equal to or below the threshold temperature, the method 600 proceeds to block 604. In block 604, the air intake valve 104 directly adjacent to the air intake 70 and the exhaust valve 106 directly adjacent to the exhaust 72 are both closed. The method 600 then proceeds to block 606. In block 606, the recirculation valve 108 is opened. The method 600 then proceeds to block 608. In block 608, the air blower 132 is activated to recirculate the forced air throughout the conduit 101 of the air snorkel 76. The method then proceeds to block 610. In block 610, the heater 134 is activated in order to produce heat, which increases the temperature of the forced air recirculating within the conduit 101 of the air snorkel 76 and the fuel cell stack 80. The method then proceeds to decision block 612. In decision block 612, the control module 92 continues to monitor the temperature sensor 210 until the temperature of the fuel cell stack 80 is equal to or greater than the warm-up temperature. Once the fuel cell stack 80 is equal to or greater than the warm-up temperature, then the method 600 terminates.

Figure 7A:
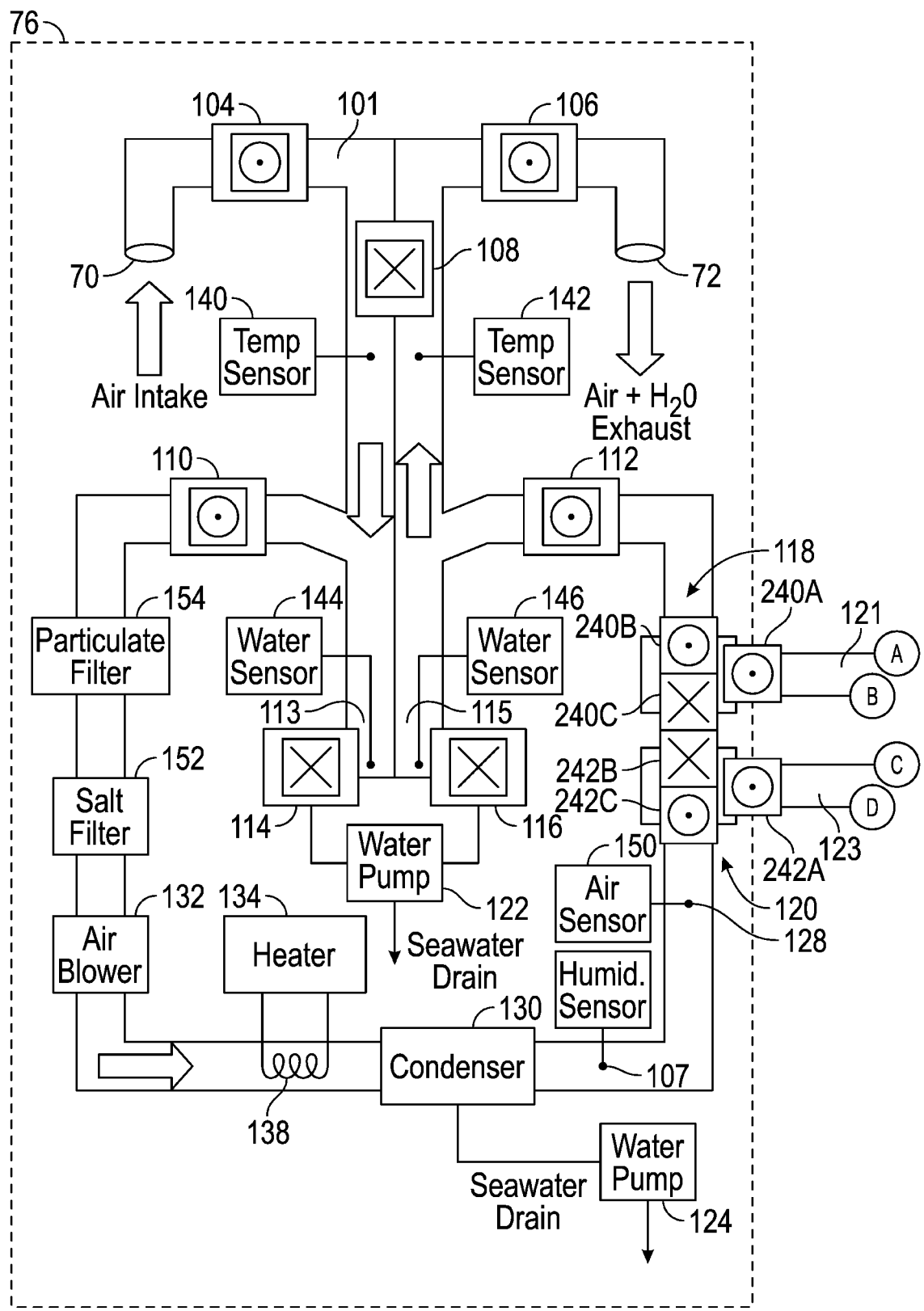
FIGS. 7A-7B are an illustration of the air snorkel subsystem delivering oxygen to the fuel cell stack.
Figure 7B:
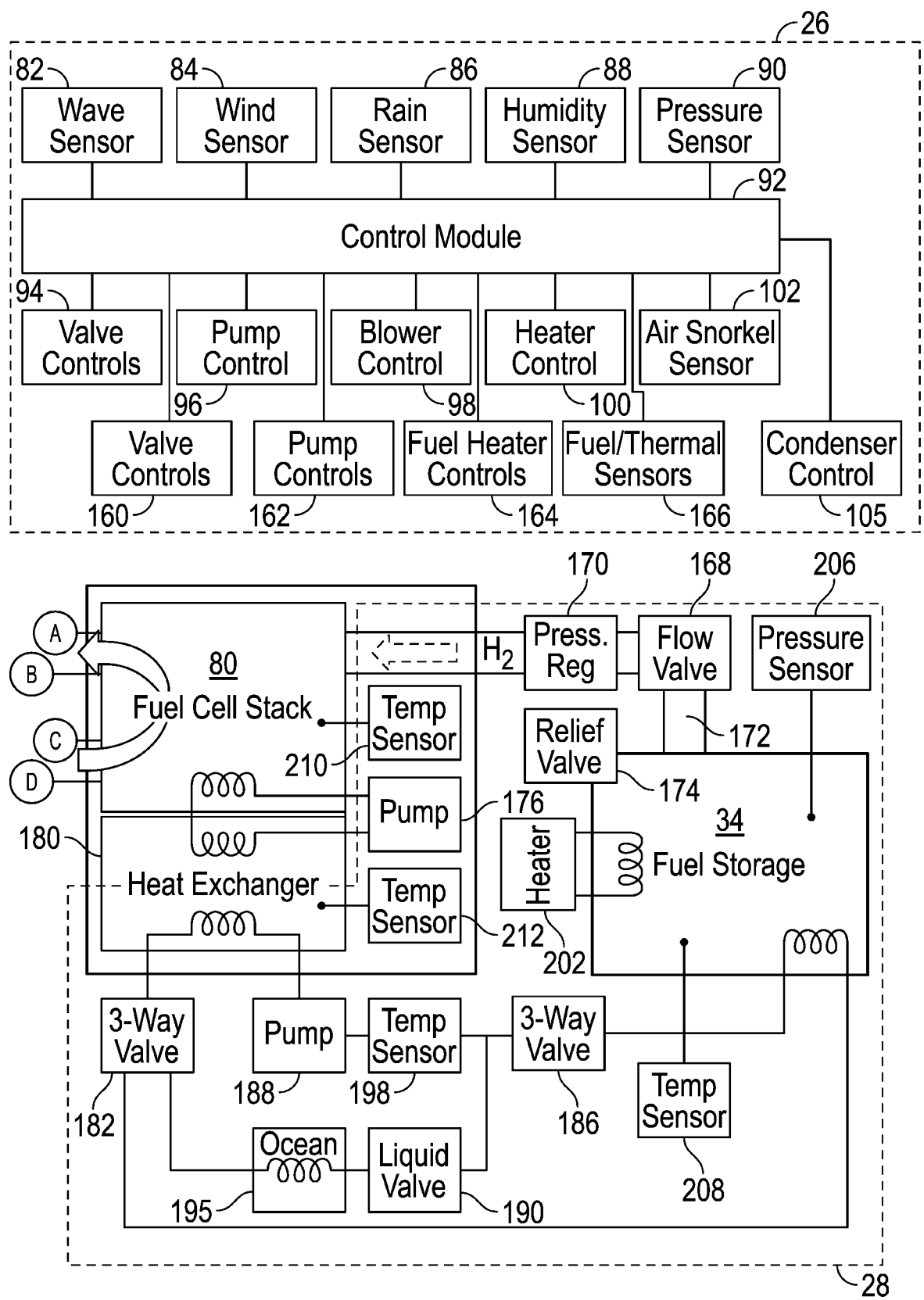

FIGS. 7A-7B is an illustration of the air snorkel 76 delivering oxygen-containing air to the fuel cell stack 80. The air snorkel 76 typically delivers oxygen-containing air to the fuel cell stack 80 when the fuel cell stack 8 is operating at relatively low power levels such that all of the oxygen is not consumed during operation. The air snorkel 76 delivers air filtered by both the salt filter 152 and the particulate filter 154 to the fuel cell stack 80. As seen in FIGS. 7A-7B, the valve control 94 opens the valves 104, 106 into the open position, closes the recirculation valve 108 into the closed position, opens the air valves 110, 112 into the open position, and closes the water valves 114, 116 into the closed position. The port 240A of the two-way diverting valve 118A located at the outlet conduit 121 and the port 240B located upstream of the air valve 112 are opened, and the remaining port 240C is in the closed position. Similarly, the port 242A of the three-way diverting valve 120 located at the inlet conduit 123 and the port 242B located downstream of the condenser 130 are both in the open position, and the remaining port 242C is in the closed position.

The air blower 132 is activated to recirculate the oxygen-containing air throughout the conduit 101 of the air snorkel 76 and to the fuel cell stack 80. The control module 92 monitors the temperature sensor 140 located adjacent to the air intake 70, which is indicative of the temperature of the ambient air that is provided to the fuel cell stack 80. The control module 92 also monitors the temperature sensor 142, which is indicative of the temperature of exhaust air. The control module 92 compares the temperature of the ambient air with a target fuel cell operating temperature, which is a target temperature at which the fuel cell 20 functions.

The control module 92 determines that the ambient temperature is either above or equal to or below the target fuel cell operating condition. In response to the control module 92 determining the ambient temperature is equal to or below the target fuel cell operating temperature, the control module 92 then monitors the temperature of the exhaust air by the temperature sensor 142. The control module 92 compares the temperature of the exhaust air with a mixing temperature. The mixing temperature represents an exhaust temperature that is sufficient to mix with the ambient air from the air intake 70 to raise the temperature of the intake air to the fuel cell operating temperature. In response to the control module 92 determining that the exhaust temperature is equal to or above the mixing temperature, the control module 92 sends a signal to the valve controls 94 to open the recirculation valve 108. The recirculation valve 108 is opened to mix the exhaust with the ambient air and raise the temperature of the intake air to the target fuel cell operating temperature. Specifically, the recirculation valve 108 is opened into either the fully opened position or into one of the plurality of variable positions based on the temperature of the ambient air, and mixes the ambient air with the air expelled by the exhaust 72 to raise the temperature of the ambient air to the target fuel cell operating temperature. The control module 92 continues to monitor the temperature sensor 140 and adjusts the valve position based on the temperature of the ambient air until the ambient air is equal to the temperature of the target fuel cell operating condition.

In an alternative embodiment, instead of opening the recirculation valve 108, the heater 134 is activated instead. Activating the heater 134 also raises the temperature of the air entering the fuel cell stack 80. Specifically, in response to the control module 92 determining that the temperature of the exhaust air is less than the mixing temperature, the control module 92 sends a signal to the heater control 100 indicating that the heater 134 is to be activated.

Figure 8:
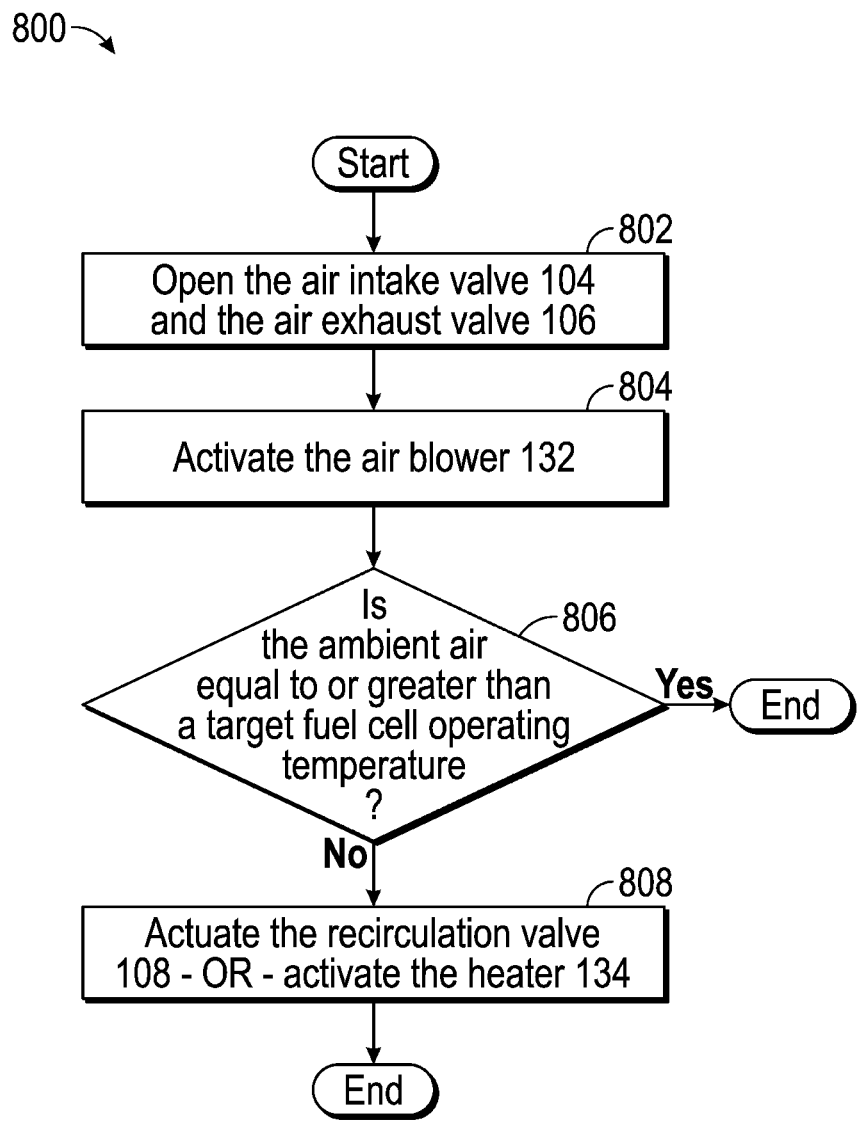
FIG. 8 is a process flow diagram of the air snorkel subsystem in FIGS. 7A-7B delivering oxygen to the fuel cell stack.

FIG. 8 is a process flow diagram illustrating a method 800 for delivering oxygen-containing air to the fuel cell stack 80. In one embodiment, the method 800 is performed after the water purging as described above and illustrated in both FIGS. 3 and 4. Referring now to both FIGS. 7 and 8, method 800 begins at block 802. In block 802, the air intake valve 104 and the exhaust valve 106 are both opened. The method 800 then proceeds to block 804. In block 804, the air blower 132 is activated by the blower control 98 to recirculate the oxygen-containing air throughout the conduit 101 of the air snorkel 76. The method 800 then proceeds to decision block 806. In decision block 806, the control module 92 monitors the air temperature at the air intake 70 by the temperature sensor 140 and the air temperature at the exhaust 72 by the temperature sensor 142. In response to the temperature sensor 140 indicating that ambient air entering the air intake 70 is equal to or above a target fuel cell operating temperature, method 800 is terminated.

In response to the temperature sensor 140 indicating that ambient air entering the intake is less than a target fuel cell operating temperature, method 800 then proceeds to block 808. In block 808, the control module 92 either actuates the recirculation valve 108 in order to heat the ambient air to the target fuel cell operating temperature, or activates the heater 134 to warm the air flowing in the conduit 101 to the target fuel cell operating temperature. As explained above, the control module 92 opens the recirculation valve 108 only if the temperature of the exhaust gas is at or above the mixing temperature, otherwise the heater 134 is activated. The method 800 is then terminated.

Figure 9A:
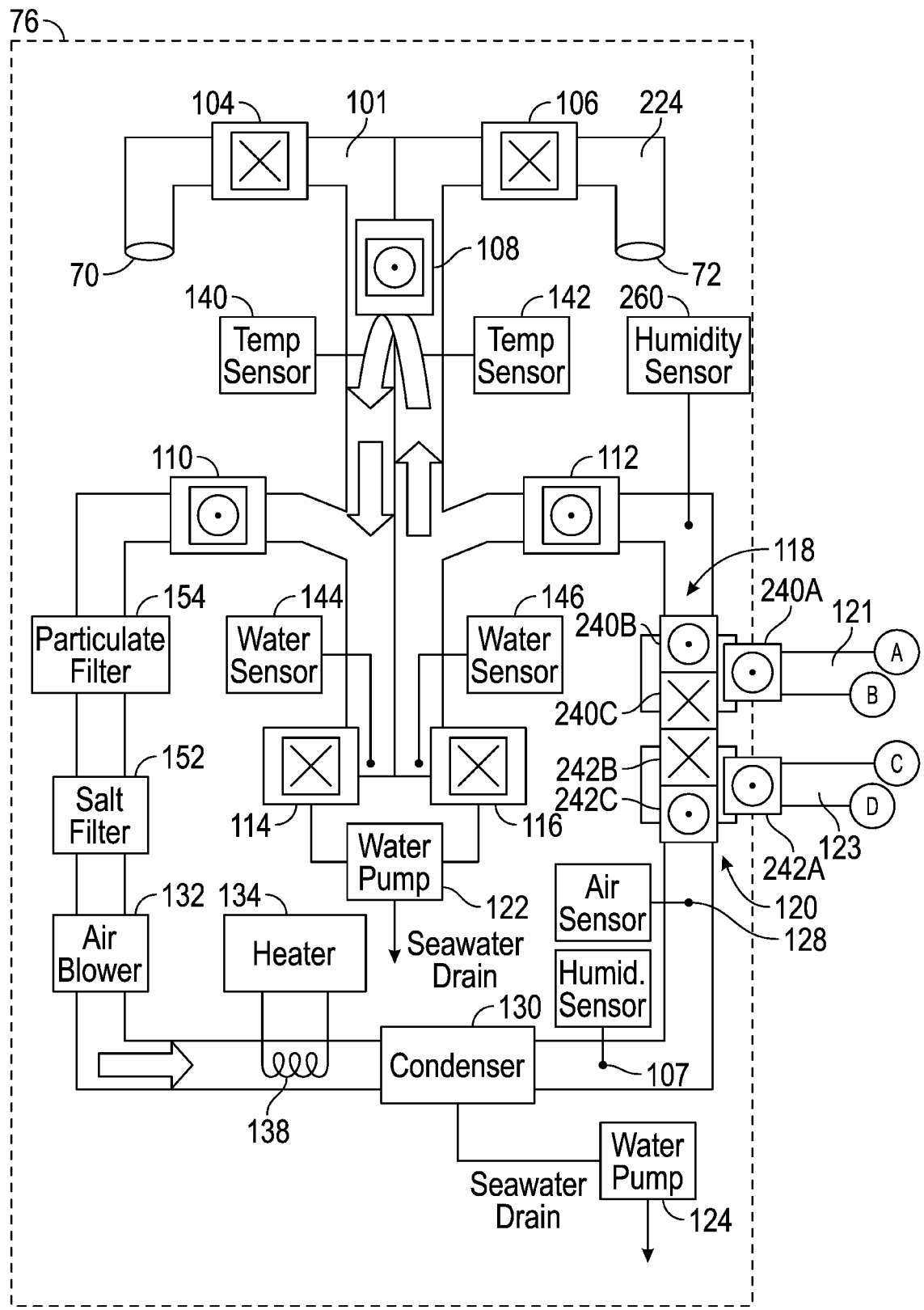
FIGS. 9A-9B are an illustration of the air snorkel subsystem purging water from the fuel cell stack to substantially prevent ice formation.
Figure 9B:
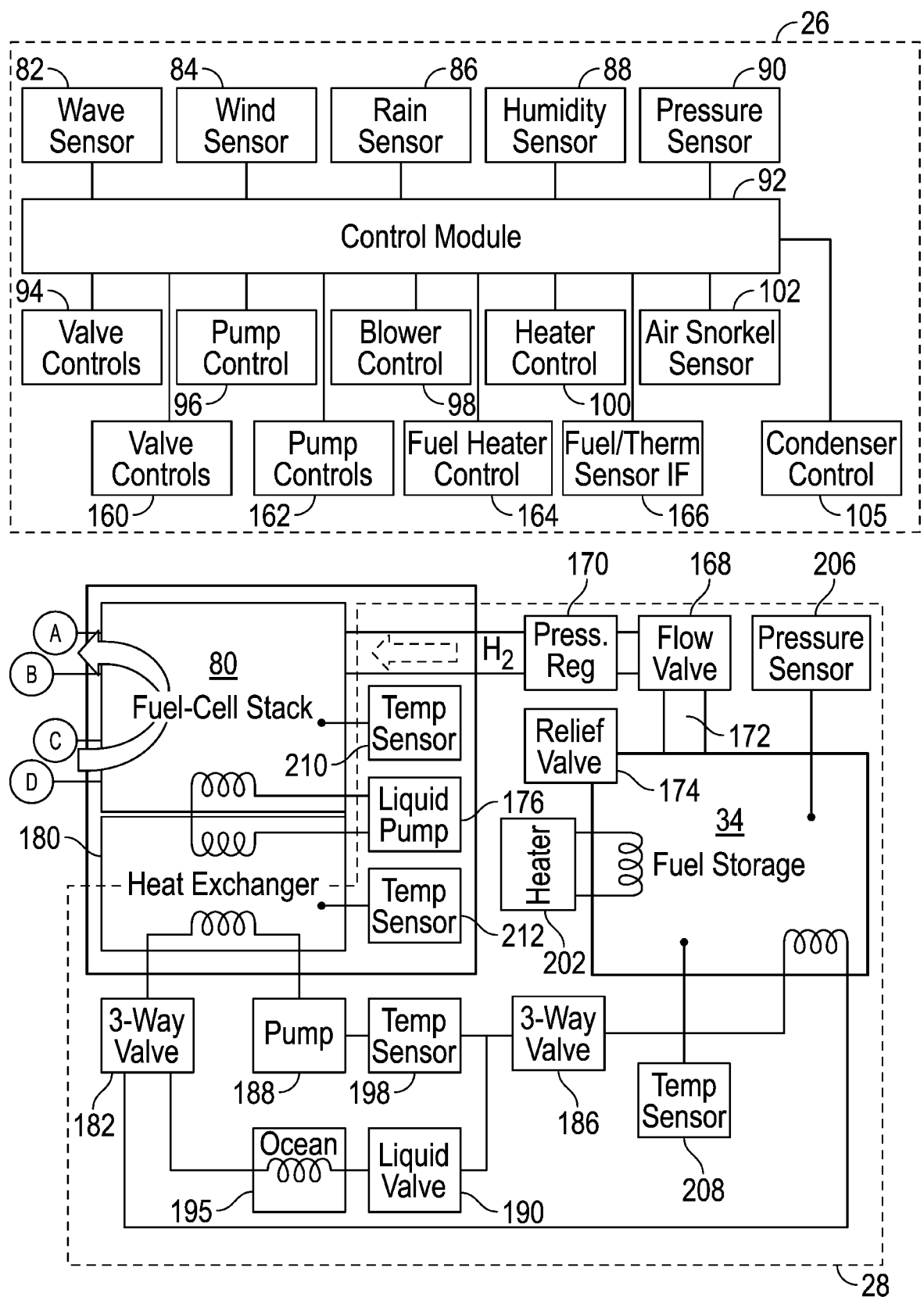

FIGS. 9A-9B are an illustration of the air snorkel 76 purging moisture from the fuel cell stack 80 when the fuel cell stack 80 is not in operation. Purging moisture from the fuel cell stack 80 substantially prevents ice formation when the fuel cell stack 80 experiences temperatures at or below the freezing point of water. As seen in FIGS. 9A-9B, the valve control 94 closes the valves 104, 106, opens the recirculation valve 108, opens the air valves 110, 112, and closes the water valves 114, 116. The port 240A of the three-way diverting valve 118 located at the outlet conduit 121 and the port 240A located upstream of the air valve 112 are both open, and the remaining port 240C is in the closed position. Similarly, the port 242A of the three-way diverting valve 120 located at the inlet conduit 123 and the port 242B located downstream of the condenser 130 are both in the open position, and the remaining port 242C is in the closed position. The blower control 98 activates the air blower 132 to recirculate air throughout the conduit 101 of the air snorkel 76. The control module 92 also activates the condenser 130 to condense water vapor contained by the air traveling through the conduit 101. The water pump 124 is fluidly connected to the condenser 130 such that when the water pump 124 is activated, the condensed water flows through the water pump 124 and is drained to seawater.

Figure 10:
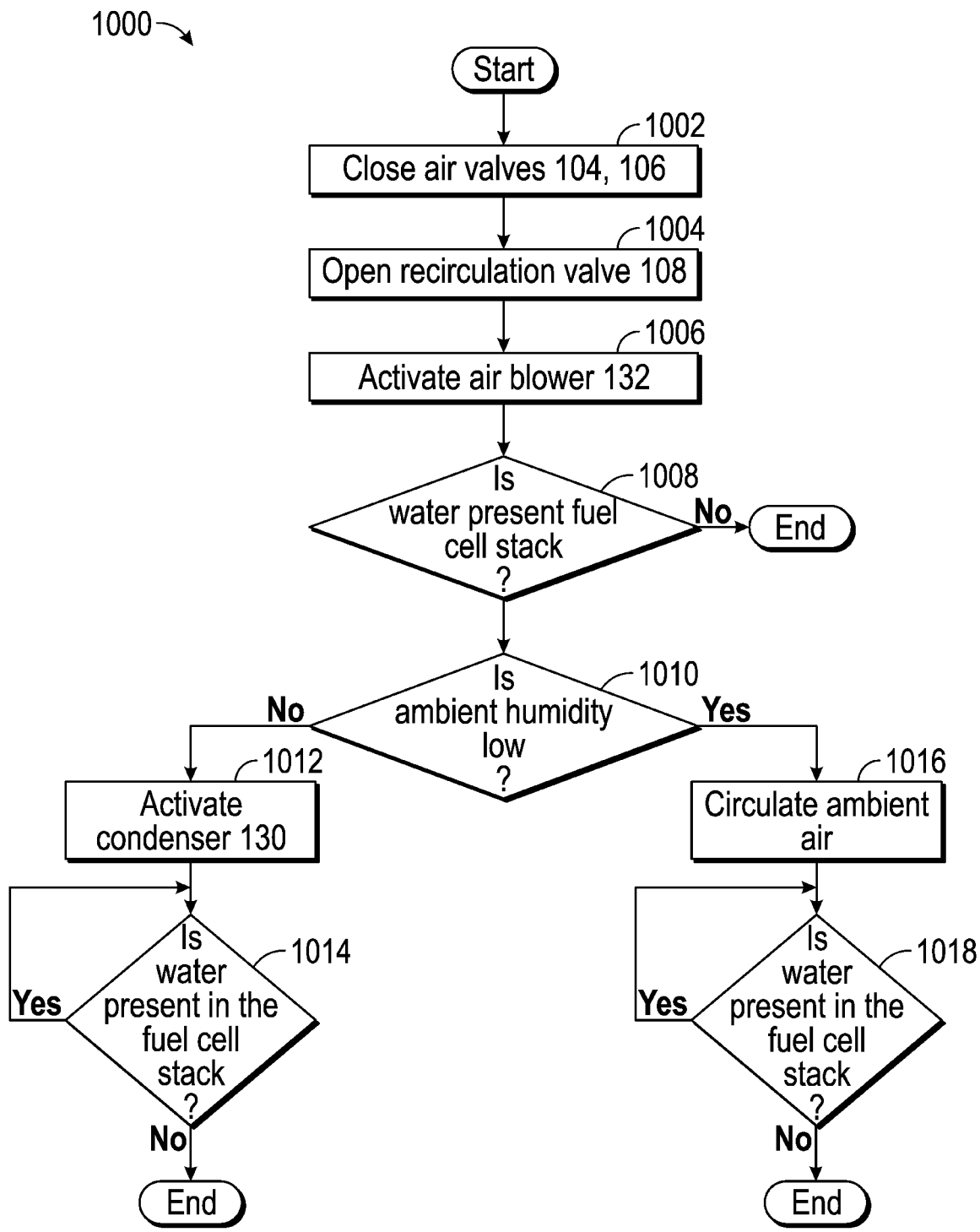
FIG. 10 is a process flow diagram of the air snorkel subsystem in FIGS. 9A-9B purging water from the fuel cell stack.

In the embodiment as shown in FIGS. 9A-9B, the air snorkel 76 also includes a humidity sensor 260. The humidity sensor 260 is positioned within the conduit 101 at a location upstream of the air valve 112 and downstream three-way diverting valve 118 in communication with the outlet conduit 121. If the humidity sensor 260 is included, a reading of an amount of water vapor added to the exhaust air may be determined by comparing the humidly of the air detected by the humidity sensor 107. If the humidity sensor 260 is not included, then the humidity sensor 107 is monitored instead to determine humidity. The humidity sensor 260 is also in communication with the control module 92. The control module 92 monitors the humidity sensors 107, 260 to determine humidity. Specifically, the control module 92 determines the presence of moisture within the fuel cell stack 80 unless the humidity reading is less than a negligible amount. The process flow diagram illustrated in FIG. 10 illustrates a method of purging the fuel cell stack 80 of moisture.

The process to remove moisture from the fuel cell stack 80 is now explained. FIG. 10 is a process flow diagram illustrating a method 1000 for water or moisture purging. Referring now to both FIGS. 9 and 10, method 1000 begins at block 1002. In block 1002, the valve control 94 closes the air intake valve 104 directly adjacent to the air intake 70 and the exhaust valve 106 adjacent to the exhaust 72. Once the valves 104, 106 are closed, then the method 1000 proceeds to block 1004. In block 1004, the recirculation valve 108 is placed into the open position. The method 1000 then proceeds to block 1006. In block 1006, the air blower 132 is activated to recirculate air within the conduit 101. The method 1000 then proceeds to decision block 1008. In decision block 1008 the control module 92 monitors the humidity sensor 260 to determine the presence of moisture within the fuel cell stack 80. In response to the control module 92 determining that the fuel cell stack 80 does not contain a substantial amount of moisture, the method 1000 may terminate.

In response to the control module 92 determining the fuel cell stack 80 contains moisture, method 1000 proceeds to decision block 1010. In decision block 1010, the control module 92 monitors the ambient humidity sensor 88 to determine the ambient air humidity. In response to the control module 92 determining that ambient air humidity exceeds a threshold relative humidity that indicates the presence of moisture within the fuel cell stack 80, the method 1000 proceeds to block 1012. In block 1012, the condenser 130 is activated. Method 1000 then proceeds to decision block 1014. In decision block 1014, the control module 92 continuously monitors the humidity sensor 260 until the fuel cell stack 80 is substantially free of moisture, and method 1000 may terminate.

In an alternative approach to method 1000, in response to the ambient air humidity being equal to or less than the threshold relative humidity, the method 1000 proceeds to block 1016. In block 1016, the air snorkel 76 provides ambient air to the fuel cell stack 80 by circulating ambient air throughout the conduit 101 by the air blower 132. This is achieved by opening both valves 104, 106. The ambient air may then circulate throughout the air snorkel 76 and to the fuel cell stack 80 for a predetermined amount of time such as, for example, about five minutes. The method 1000 may then proceed to decision block 1018. In decision block 1018, the valves 104, 106 are closed, and the control module 92 monitors the humidity sensor 260 to determine the presence of moisture. In response to the control module 92 determining the presence of moisture, method 1000 returns to block 1016. However, in response to the control module 92 determining the fuel cell stack 80 is substantially free of water, method 1000 may then terminate.

Figure 11A:
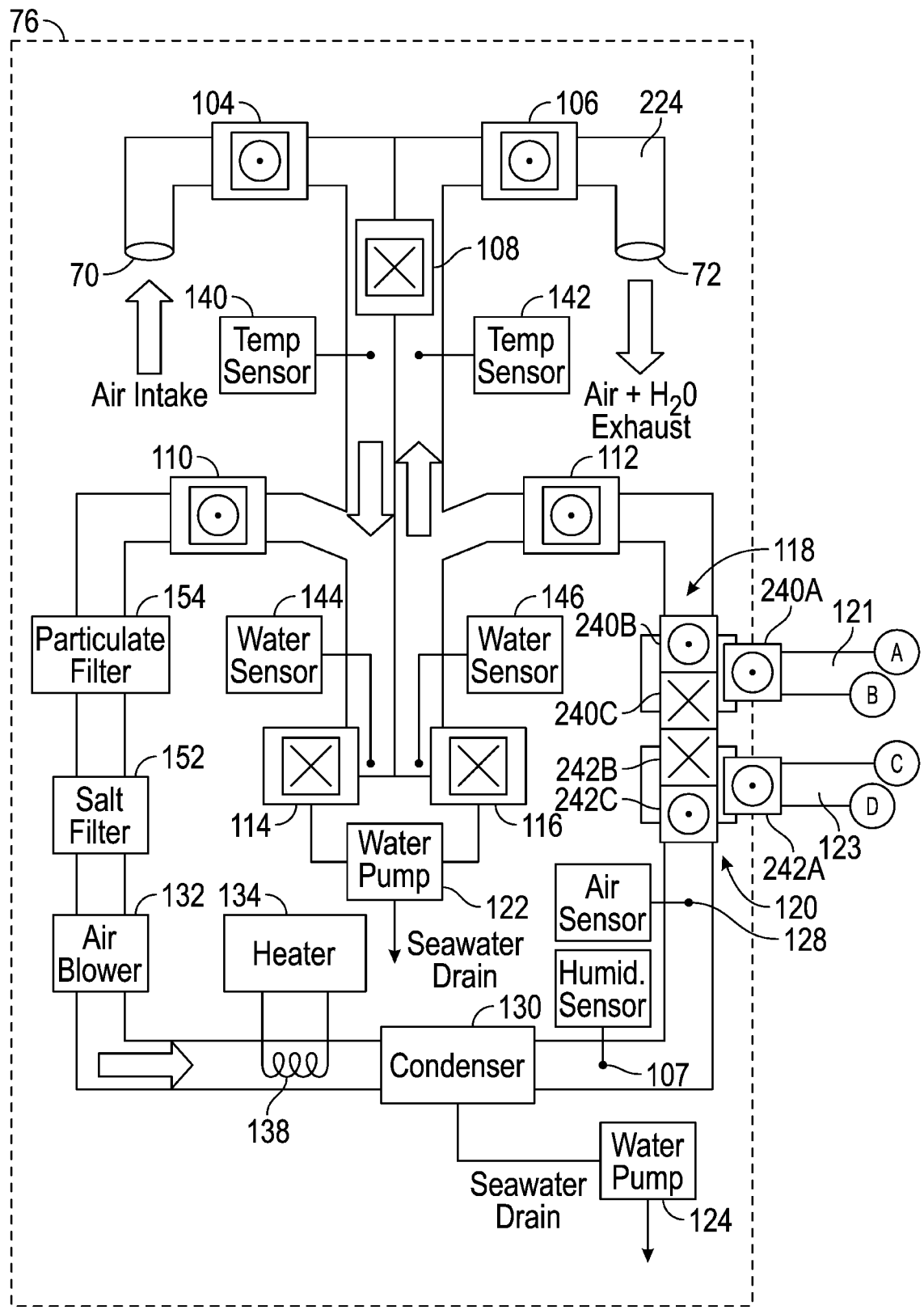
FIGS. 11A-11B are an illustration of the air snorkel subsystem operating at a heat removal mode.
Figure 11B:
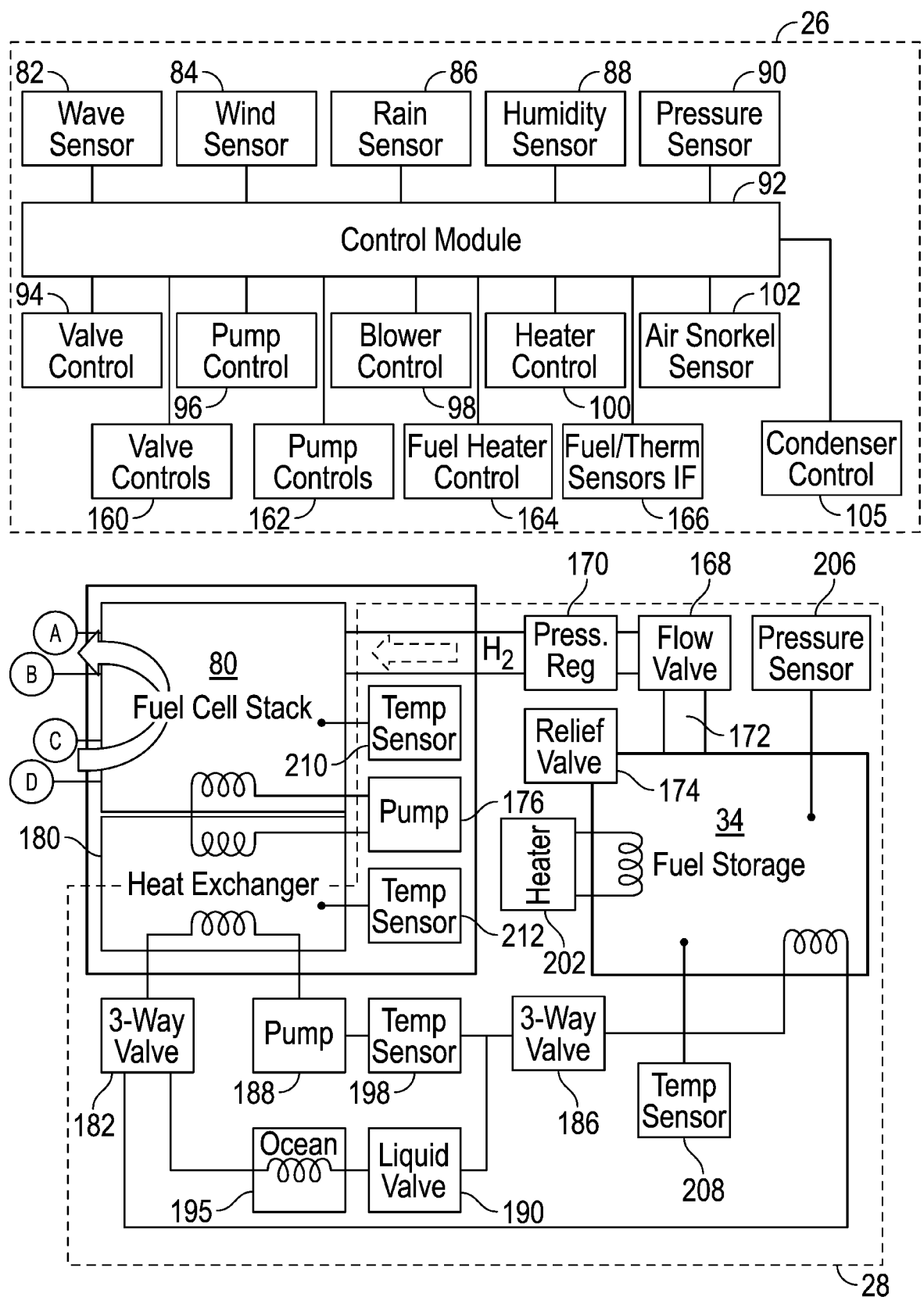

FIGS. 11A-11B are an illustration of the air snorkel 76 operating at a heat removal mode. During the heat removal mode waste heat created by the fuel cell stack 80 during operation is removed, without the need to circulate coolant through the heat exchanger 180 of the energy management control system 26. Instead, as explained below, an air flow rate through the fuel cell stack 80 is increased. Specifically, the air blower 132 is activated to increase the air flow rate through the fuel cell stack 80, which in turn provides cooling to the fuel cell stack 80. Specifically, the fuel cell stack 80 is cooled to a target stack temperature. The target stack temperature represents a target operating point based on a given power output setting.

The air flow required to cool the fuel cell stack 80 is based on the ambient temperature monitored by the temperature sensor 140 situated adjacent to the intake, as well as a power output setting of the fuel cell 20 (FIG. 1). At higher flow rates, very low ambient temperatures make air-based cooling of the fuel cell stack 80 more efficient when compared to activating the primary pump 176 to circulate coolant through the heat exchanger 180 of the energy management control system 26. The very low ambient temperatures are a function of the fuel cell power output setting at a given time, and therefore is not a fixed number. However, as the value of the ambient temperature rises, at some switch-over ambient temperature it becomes more efficient to circulate coolant through the heat exchanger 180. Thus, the control module 92 continuously monitors the power consumed by the air blower 132. In response to the control module 92 determining that the power consumed by the air blower 132 is greater than an average power consumption by the primary pump 176, the control module 92 activates the primary pump 176 to circulate coolant through the fuel cell stack 80.

During the heat removal mode, the valve control 94 opens the valves 104, 106, closes the recirculation valve 108, opens the air valves 110, 112, and closes the water valves 114, 116. The port 240A of the three-way diverting valve 118 located at the outlet conduit 121 and the port 240B located upstream of the air valve 112 are both opened, and the remaining port 240C is in the closed position. Similarly, the port 242A of the three-way diverting valve 120 located at the inlet conduit 123 and the port 242B located downstream of the condenser 130 are both in the open position, and the remaining port 242C is in the closed position. The control module 92 activates the air blower 132 to recirculate air throughout the conduit 101 of the air snorkel 76.

Figure 12:
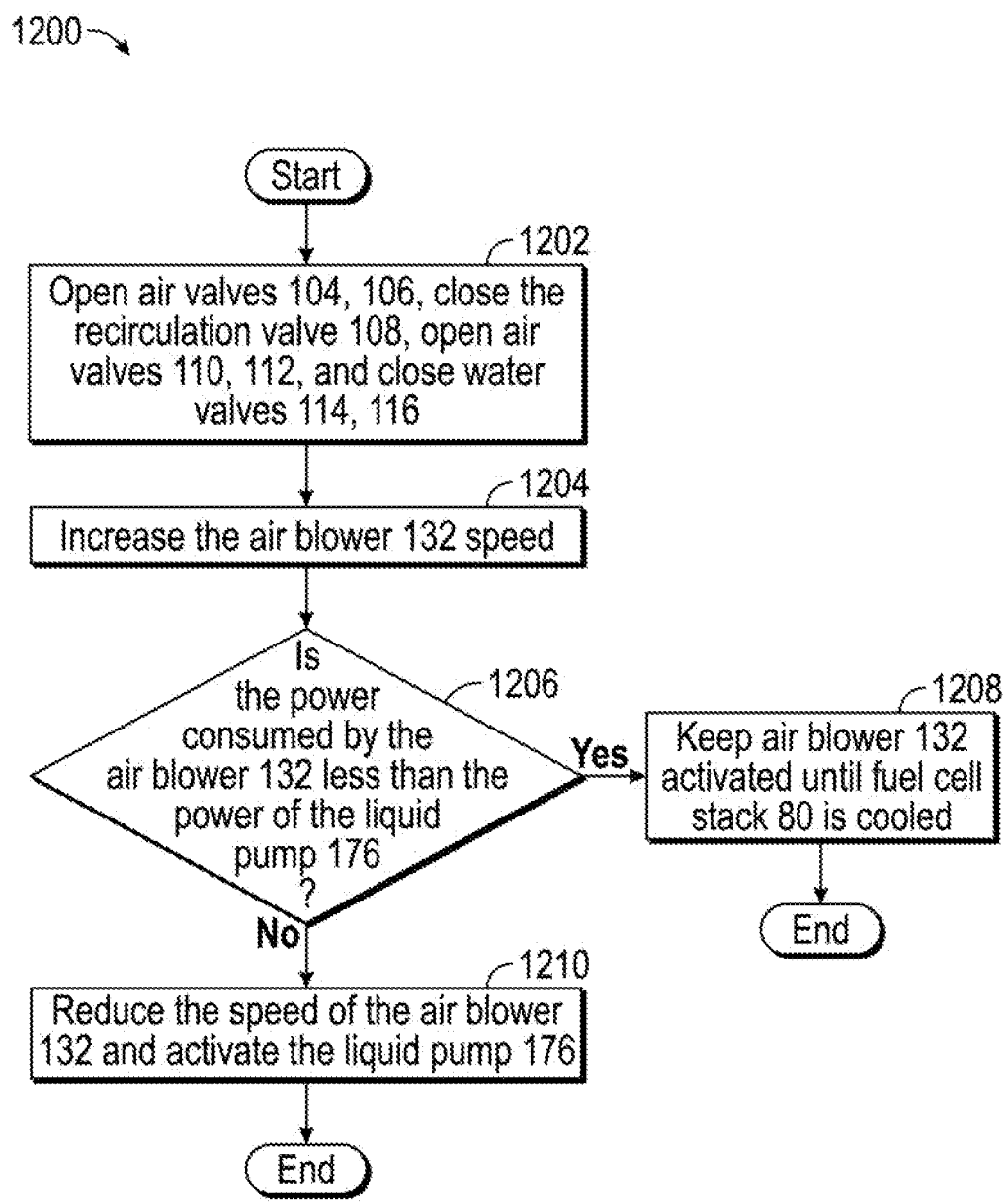
FIG. 12 is a process flow diagram of the air snorkel subsystem in FIGS. 11A-11B operating at the heat removal mode.

The air-based heat removal mode is now explained. This mode is employed concurrently with delivering oxygen-containing air to the fuel cell stack 80 as described above and shown in FIGS. 7A-7B. FIG. 12 is a process flow diagram illustrating a method 1200 for air cooling the fuel cell stack 80. Referring now to both FIGS. 10 and 11, the method 1200 begins at block 1202. In block 1202, the valve control 94 opens the air intake valve 104 directly adjacent to the air intake 70 and the exhaust valve 106 adjacent to the exhaust 72. The recirculation valve 108 is also closed, the air valves 110, 112 are opened, and the water valves 114, 116 are closed. The method 1200 proceeds to block 1204. In block 1204, the blower control 98 increases the speed of the air blower 132 above a minimum speed required to supply oxygen-containing air to the fuel cell. The increased blower speed results in an increased air flow rate and air-cooling capacity. The method 1200 then proceeds to decision block 1206. In decision block 1206, the control module 92 continuously monitors the power consumed by the air blower 132 and compares the power consumed by the air blower 132 to an amount of power consumed by the primary pump 176 of the heat exchanger 180 for cooling the fuel cell stack 80. In response to the control module 92 determining the power consumed by the air blower 132 is equal to or less than the power consumed by the primary pump 176, method proceed to block 1208. In block 1208, the control module 92 continues to keep the air blower 132 activated to cool the fuel cell stack 80 to the target stack temperature, and method 1200 then terminates.

In response to the control module 92 determining the air blower 132 consumes more power than the power consumed by the primary pump 176, the method proceeds to block 1210. In block 1210 the control module 92 reduces the speed of the air blower 132 to achieve the air flow rate needed for a given fuel-cell power output setting, and activates the primary pump 176 cool the fuel cell stack 80 to the target stack temperature, and method 1200 then terminates.

FIGS. 13A-13B is an illustration of the fuel and thermal management system 28 heating the metal-hydride fuel-storage substrate in the fuel storage 34 to release gaseous hydrogen fuel. The metal-hydride fuel-storage substrate is heated to a target temperature to achieve target gaseous hydrogen fuel generation rate before the fuel is sent to the fuel cell stack 80. Specifically, the metal-hydride fuel storage substrate is heated to the target temperature in order to achieve a target hydrogen gas evolution rate and operating pressure. The hydrogen gas evolution/consumption rate is based on the target power output of the fuel cell stack 80.

During heating of the metal-hydride fuel storage substrate to release gaseous hydrogen fuel, the control module 92 closes the flow valve 168 to block gaseous hydrogen fuel from the fuel storage 34 from flowing to the fuel cell stack 80. The control module 92 activates the heater 202 to warm the fuel storage substrate to the target fuel pressure. The control module 92 monitors the pressure sensor 206 to determine gas pressure of the fuel-storage modules 40 and the temperature sensor 208 to determine an internal temperature of the fuel-storage module 40. The heater 202 is deactivated in response to determining that the gas pressure has reached or exceeded a predefined limit, or that the internal temperature of the fuel-storage module 40 is at the target temperature. The control module 92 activates the heater 202 based on an on-and-off or duty cycle. Once the internal temperature of the fuel-storage module 40 is at the target temperature, the heater 202 is deactivated. Although FIGS. 13A-13B illustrates heating the metal-hydride fuel storage substrate using the heater 202, in another embodiment the metal-hydride fuel storage substrate is heated by the reaction waste heat from the fuel cell stack 80. Specifically, in one embodiment an air exhaust (not illustrated) is provided, where the air exhaust is heated by the reaction waste heat from the fuel cell stack 80. The heated air is circulated through the fuel storage 34 to provide heating to the fuel.

Figure 14:
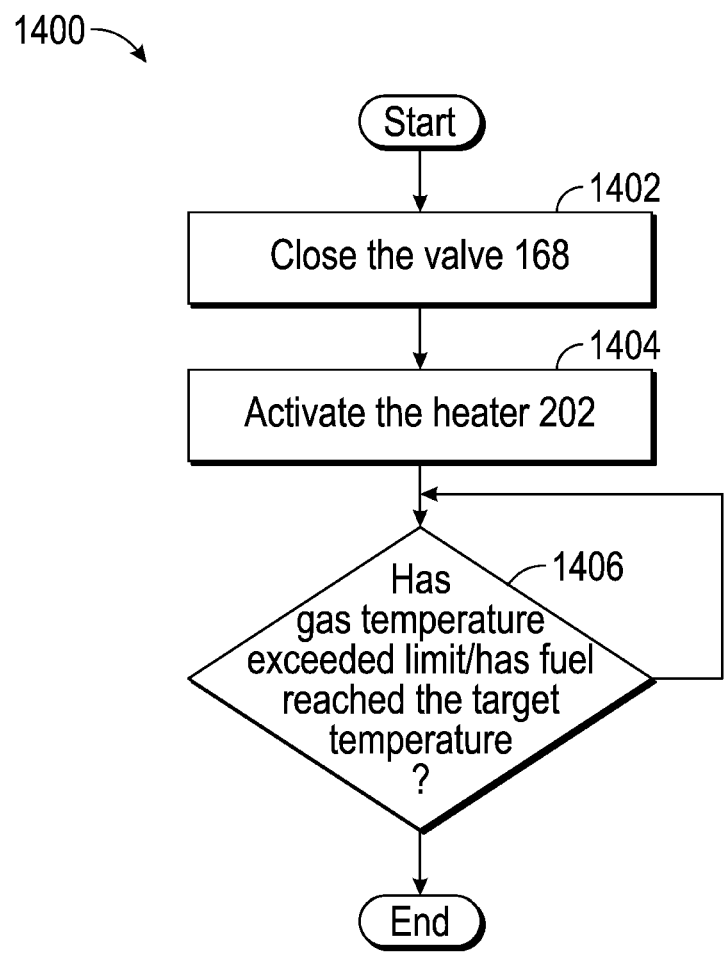
FIG. 14 is a process flow diagram of the fuel and thermal management system in FIGS. 13A-13B preheating the hydrogen fuel stored in the fuel storage.

FIG. 14 is a process flow is a process flow diagram illustrating a method 1400 for heating the metal-hydride fuel in the fuel storage 34 to release gaseous hydrogen fuel. Referring now to both FIGS. 13 and 14, the method 1400 begins at block 1402. In block 1402, the valve control 160 closes the flow valve 168, which blocks the flow of fuel from the fuel storage 34. The method 1400 then proceeds to block 1404. In block 1404, fuel heater control 164 activates the heater 202. The method 1400 then proceeds to decision block 1406. In decision block 1406, control module 92 continuously monitors the pressure sensor 206 and the temperature sensor 208, and the heater 202 continues to heat the fuel storage substrate in the fuel storage 34 to release gaseous hydrogen fuel. In response to determining that the gas pressure has reached or exceeded a predefined limit or that the internal temperature of the fuel-storage module 40 is at the target temperature, the control module 92 deactivates the heater 202 and method 1400 terminates.

Figure 15A:
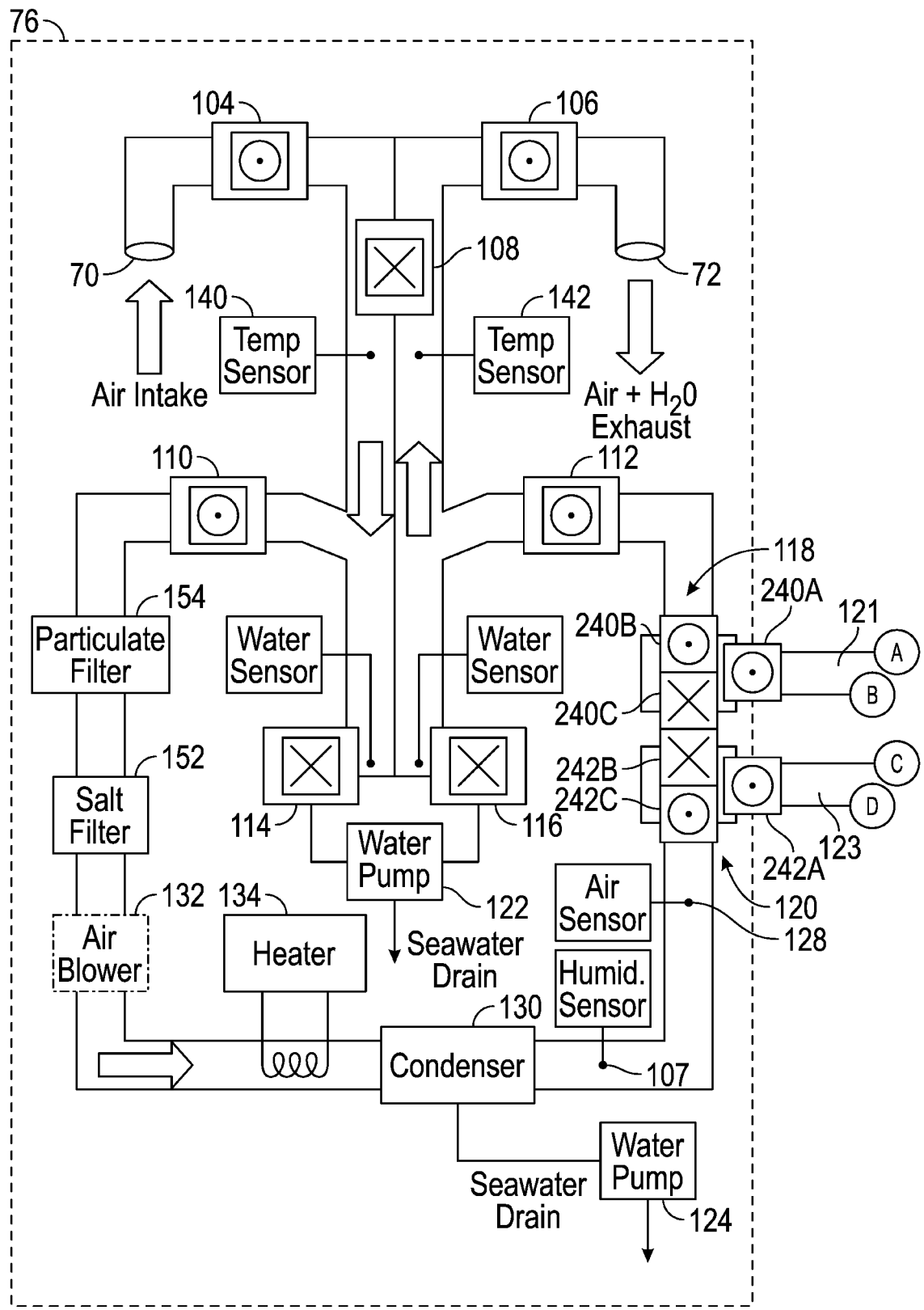
FIGS. 15A-15B are an illustration of a fuel and thermal management system using waste heat created by the fuel cell stack to catalyze hydrogen production of metal-hydride fuel.
Figure 15B:
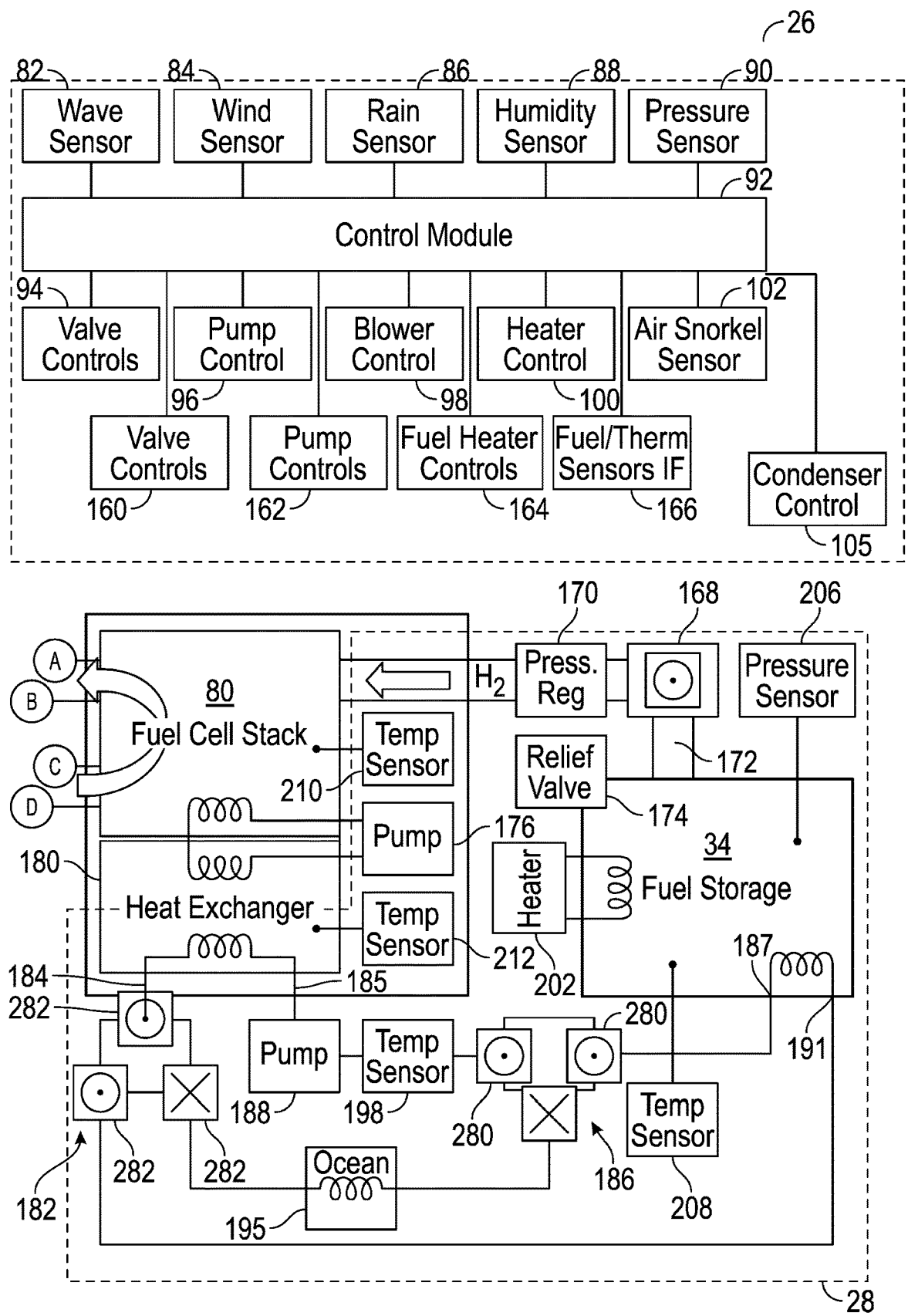

FIGS. 15A-15B are an illustration of using the waste heat created by the fuel cell stack 80 to catalyze hydrogen production. During hydrogen production, the air snorkel 76 delivers oxygen to the fuel cell stack 80, which is described above and illustrated in FIGS. 7A-7B. The valve control 160 opens the flow valve 168 to allow for hydrogen to flow to the fuel cell stack 80. The fuel and thermal sensor control 166 monitors the pressure sensor 206 and the temperature sensor 208 of the fuel storage 34. The pump controls 162 activates both the primary pump 176 of the fuel cell stack 80 as well as the secondary pump 188 of the fuel cell stack 80. The secondary pump 188 of the heat exchanger 180 circulates coolant within the secondary circuit 189 between the fuel storage 34 and the heat exchanger 180. The heat exchanger 180 draws waste heat from the fuel cell stack 80 through the primary circuit 177. The waste heat produced by the fuel cell stack 80 is conducted by the coolant flowing through the heat exchanger 180, and the coolant is circulated to the fuel storage 34 to heat the metal hydride. Thus, waste heat generated by the fuel cell stack 80 is used to catalyze the hydrogen production of the metal hydride stored in the fuel storage 34.

The three-way valve 186 includes three ports 280 for transporting cooling through the secondary circuit 189 from the fuel storage 34 to the heat exchanger 180. One port 280 is fluidly connected to an outlet 187 of the fuel storage 34, another port 280 is fluidly connected to an inlet 185 of the heat exchanger 180, and a port 280 is fluidly connect to the water-cooled heat exchanger 195. The three-way valve 182 also includes three ports 282 for transporting coolant within the secondary circuit 189 away from the heat exchanger 180 and to the fuel storage 34. One of the ports 282 is fluidly connected to an outlet 184 of the heat exchanger 180, another port 282 is fluidly connected to an inlet 191 of the fuel storage 34, and the remaining port 282 is connected to the water-cooled heat exchanger 195. The pump controls 162 open the port 280 fluidly connected to the outlet 187 of the fuel storage 34 and the port 280 fluidly connected to the inlet 185 of the heat exchanger. Moreover, the pump controls 162 open the port 282 fluidly connected to the outlet 184 and the port 282 fluidly connected to the inlet 191 of the fuel storage 34 of the three-way valve 182. Thus, coolant flows through the secondary circuit 189 and is warmed by the waste heat from the fuel cell stack 80 absorbed by the heat exchanger 180. The coolant is then transported to the fuel storage 34 to heat the fuel stored therein.

Continuing to refer to FIGS. 15A-15B, the control module 92 monitors the temperature sensor 208 to ensure that the internal temperature of the fuel storage 34 is maintained at the target temperature. The valve control 160 and pump controls 162 adjusts the flow of coolant to the fuel storage 34 to maintain the fuel at the target temperature, where the three ports 282 of the three-way valve 182 and the three ports 280 of the three-way valve 186 are modulated to adjust the flow of coolant to the fuel storage 34. Specifically, the three ports 282 of the three-way valve 182 and the three ports 280 of the three-way valve 186 control the amount of coolant through the heat exchanger 180 and the water-cooled heat exchanger 195 to maintain the fuel at the target temperature.

Figure 16:
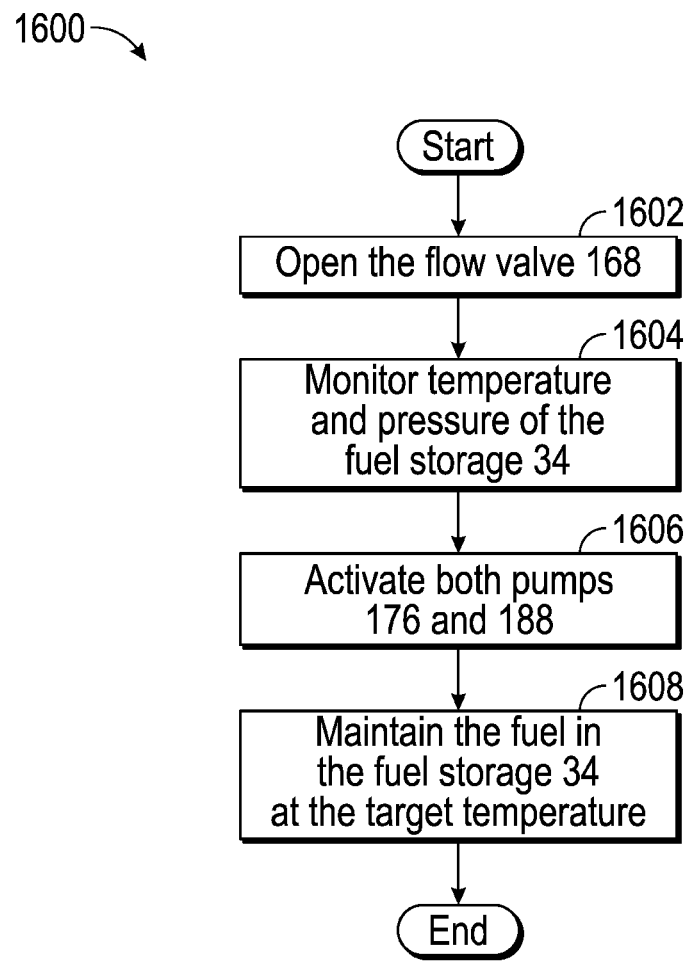
FIG. 16 is a process flow diagram of the fuel and thermal management system in FIGS. 15A-15B using the waste heat to catalyze hydrogen production of metal-hydride fuel.

FIG. 16 is a process flow diagram illustrating a method 1600 for using the waste heat created by the fuel cell stack 80 to catalyze hydrogen production. Referring now to both FIGS. 15 and 16, the method 1600 begins at block 1602. In block 1602, the valve control 160 opens the flow valve 168. The method 1600 then proceeds to block 1604. In block 1604, the fuel and thermal sensors control 166 monitors the pressure sensor 206 and the temperature sensor 208 of the fuel storage 34. The method 1600 then proceeds to block 1606. In block 1606, the pump controls 162 activate both the primary pump 176 of the fuel cell stack 80 as well as the secondary pump 188 of the fuel cell stack 80. Thus, the secondary pump 188 of the heat exchanger 180 circulates coolant within the secondary circuit 189 between the fuel storage 34 and the heat exchanger 180. The heat exchanger 180 draws waste heat from the fuel cell stack 80 through the primary circuit 177 that warms the fuel storage substrate within the fuel storage 34 to the target temperature corresponding to a target gaseous hydrogen evolution rate. The method 1600 then proceeds to block 1608. In block 1608, the control module 92 monitors the temperature sensor 208 to ensure that the internal temperature of the fuel-storage module 40 is maintained at the target temperature. Specifically, the valve controls 160 and pump controls 162 modulate the two open ports 282 of the three-way valve 182 and the two open ports 280 of the three-way valve 186 to adjust the flow of coolant to the fuel storage 34. The method 1600 then terminates.

Figure 17A:
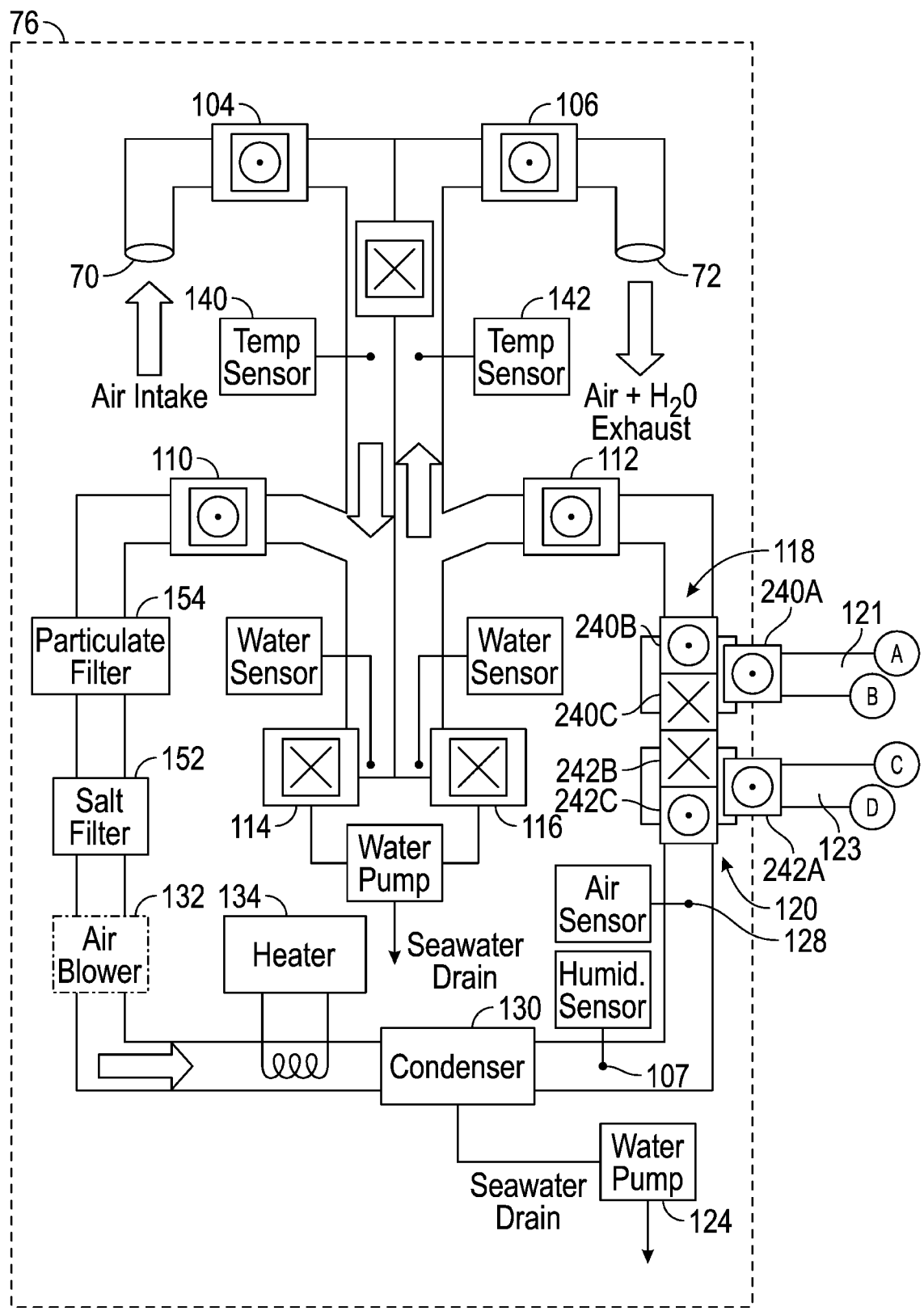
FIGS. 17A-17B are an illustration of the fuel and thermal management system removing waste heat from the fuel cell stack.
Figure 17B:
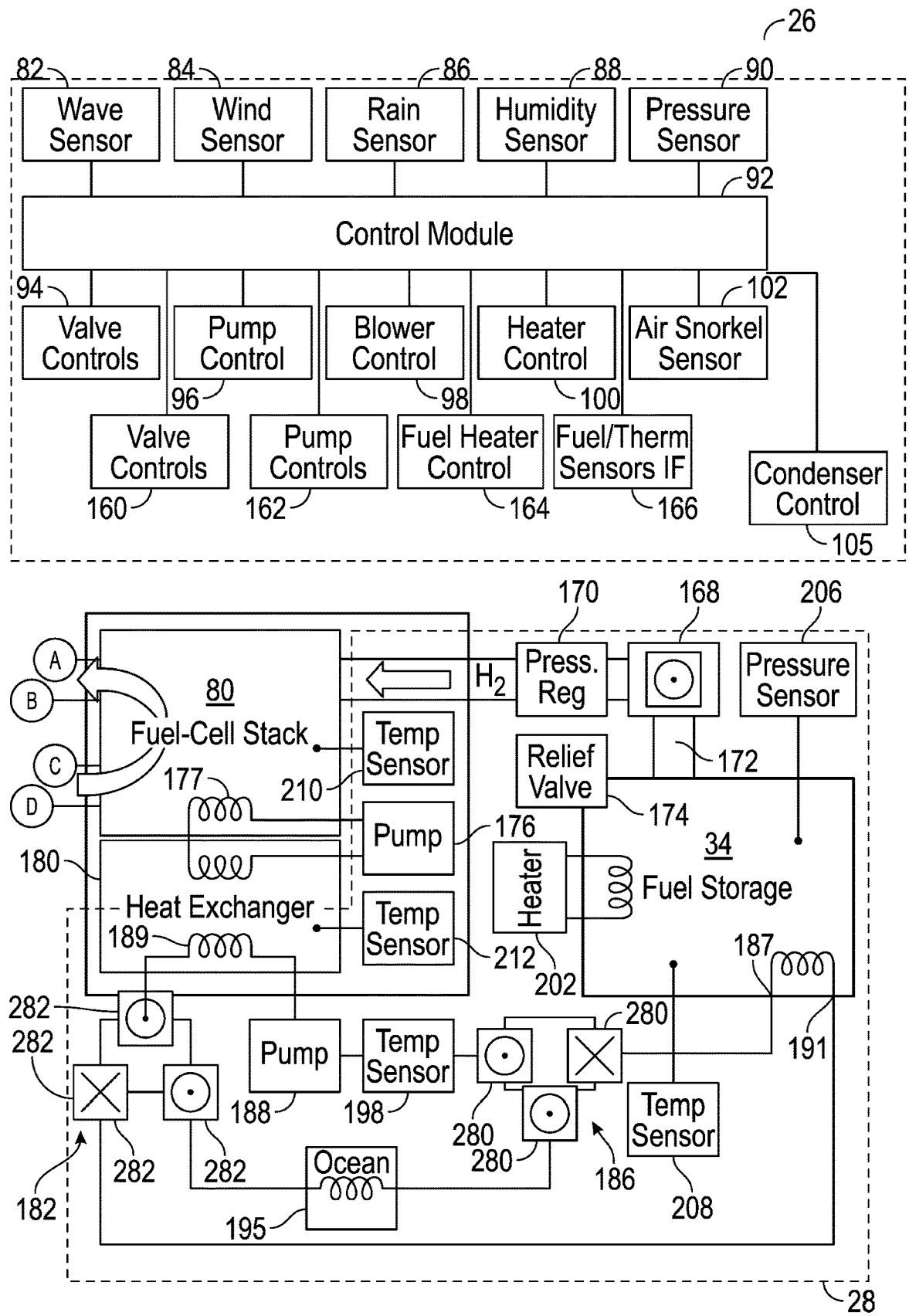

FIGS. 17A-17B are an illustration of the fuel and thermal management system 28 removing reaction waste heat from the fuel cell stack 80. Similar to the embodiment as shown in FIGS. 15A-15B, the air snorkel 76 delivers oxygen to the fuel cell stack 80, which is described above and illustrated in FIGS. 7A-7B. The valve control 160 opens the flow valve 168 to allow for fuel to be sent to the fuel cell stack 80. The primary pump 176 and the secondary pump 188 are both activated. The port 280 of the three-way valve fluidly connected to an outlet 187 of the fuel storage 34 is closed, and the port 280 is fluidly connected to the inlet 185 of the heat exchanger 180 and the port 280 is fluidly connected to the water-cooled heat exchanger 195 are modulated to split or divide the flow of coolant between the primary circuit 177 and the secondary circuit 189. The port 282 of the three-way valve 182 fluidly connected to the outlet 184 of the heat exchanger 180 and the port 282 fluidly connected to the water-cooled heat exchanger 195 are both modulated as well, and the port 282 fluidly connected to the inlet 191 of the fuel storage 34 is closed. Specifically, the two port 282 of the three-way valve 182 are modulated to split or divide the flow of coolant between the primary circuit 177 and the secondary circuit. The coolant flows through the secondary circuit 189, and into the water-cooled heat exchanger 195 to be cooled. In other words, reaction waste heat produced by the fuel cell stack 80 is conducted by coolant flowing through the heat exchanger 180, and the coolant is circulated to the water-cooled heat exchanger 195, which is cooled by a body of water that the unmanned surface vehicle 12 is deployed within.

The control module 92 monitors the temperature sensor 198 to monitor the temperature of the coolant in the secondary circuit 189. The control module 92 also monitors the temperature sensor 210 to determine the temperature of the fuel cell stack 80. The coolant flow through the primary circuit 177 is adjusted by controlling the flow rate of the primary pump 176 and the coolant flow in the secondary circuit 189 is adjusted by controlling the flow rate of the secondary pump 188. Specifically, the coolant flow rates of the primary circuit 177 and the secondary circuit 189 are adjusted to maintain the fuel cell stack 80 at the target stack temperature.

Figure 18:
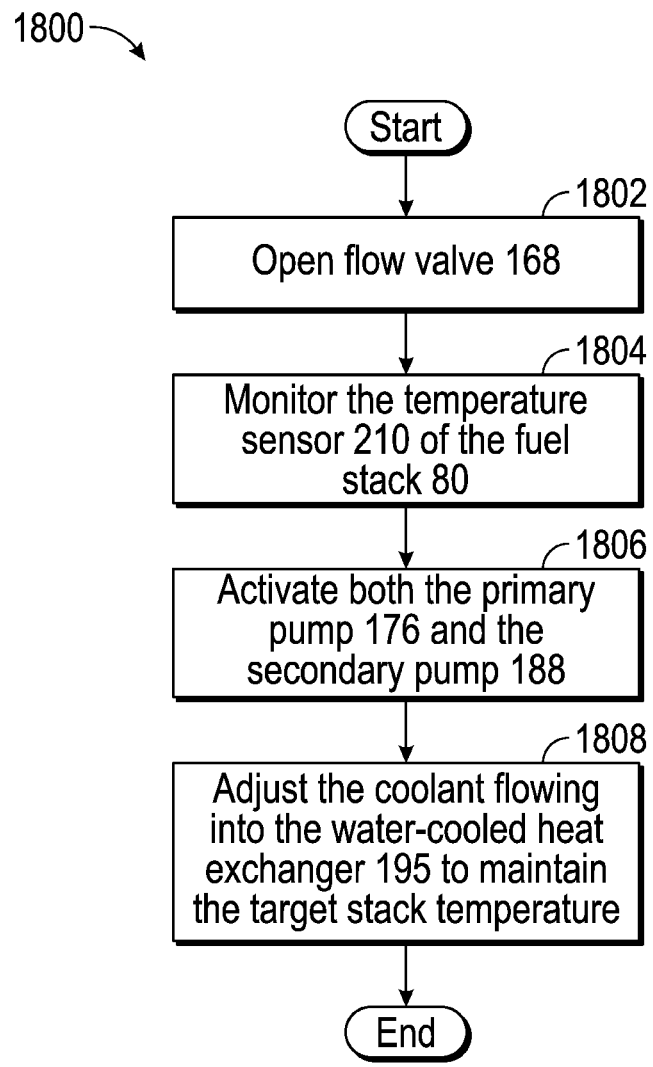
FIG. 18 is a process flow diagram of the fuel and thermal management system in FIGS. 17A-17B removing the waste heat from the fuel cell stack using a heat exchanger cooled by ocean water.

FIG. 18 is a process flow diagram illustrating a method 1800 for removing reaction waste heat from the fuel cell stack 80. Referring now to both FIGS. 17 and 18, the method 1800 begins at block 1802. In block 1802, the valve control 160 opens the flow valve 168. The method 1800 then proceeds to block 1804. In block 1804, the control module 92 monitors the temperature sensor 210 of the fuel cell stack 80. The method 1800 then proceeds to block 1806. In block 1806, the control module 92 activates both the primary pump 176 as well as the secondary pump 188. As seen in FIGS. 17A-17B, the water-cooled heat exchanger 195 removes the reaction waste heat from the coolant flowing through the secondary circuit 189. The method 1800 then proceeds to block 1808. In block 1808, the control module 92 monitors the temperature sensor 210 to ensure that the fuel cell stack 80 is maintained at the target stack temperature. Specifically, the secondary pump 188 adjusts the amount of coolant flowing into the water-cooled heat exchanger 195 in order to maintain the fuel cell stack 80 at the target stack temperature. The method 1800 then terminates.

Referring generally to the figures, technical effects and benefits of the disclosure include a power system having a fuel cell that provides the power required to operate the unmanned surface vehicle, especially during long duration missions. The disclosed power system allows for relatively simple and easy refueling of the fuel cell, includes high efficiency, and also includes a relative low noise signature. The power system includes exchangeable fuel-storage modules that provide the additional energy, thereby allowing the unmanned surface vehicle to operate in harsh conditions for long durations of time. The air snorkel provides air to operate the fuel cell while the unmanned surface vehicle is deployed within a body of water, and also provides other functions as well that remove water from the fuel cell stack, preheat the fuel cell stack during cold ambient temperatures, and also removes waste heat from the fuel cell stack. The fuel and thermal management system heats the fuel storage substrate in the fuel storage to catalyze hydrogen production, uses waste heat created by the fuel cell stack to catalyze hydrogen production (if the fuel storage stores metal hydride), and also removes waste heat from the fuel cell stack.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. An unmanned surface vehicle including a power system, the power system comprising:
   a fuel cell including a fuel cell stack, wherein the fuel cell stack includes a fuel inlet;
   a fuel storage including at least one fuel-storage module fluidly connected to the fuel inlet of the fuel cell stack, wherein the at least one fuel-storage module is a source of energy for the fuel cell; and
   a fuel and thermal management system fluidly connected to the fuel inlet of the fuel cell stack, wherein the fuel and thermal management system comprises:
      a heat exchanger in thermal communication with the fuel cell stack for removing waste heat produced by the fuel cell stack during operation;
      a primary circuit and a secondary circuit, wherein the primary circuit circulates coolant between the fuel cell stack and the heat exchanger, and the secondary circuit circulates the coolant between the fuel storage and the heat exchanger;
      a liquid valve and a diverter conduit, wherein the liquid valve is opened in order to allow the coolant circulating in the secondary circuit to flow through the diverter conduit;
      a water-cooled heat exchanger, wherein the coolant flowing through the diverter conduit flows to the water-cooled heat exchanger, wherein the water-cooled heat exchanger is cooled by a body of water the unmanned surface vehicle is deployed within; and
      a flow valve, a pressure regulator, and a conduit, wherein the conduit fluidly connects the fuel storage to the fuel cell stack to deliver fuel from the fuel storage to the fuel cell stack by the conduit, and the flow valve and the pressure regulator are both located along the conduit.

2. The unmanned surface vehicle of claim 1, further comprising a control module in communication with a heater, wherein the heater is in thermal communication with and heats fuel contained within the fuel storage.

3. The unmanned surface vehicle of claim 2, wherein the fuel storage includes a metal-hydride fuel-storage substrate, and wherein the control module activates the heater to warm the metal-hydride fuel-storage substrate to a target temperature to achieve a target gaseous hydrogen fuel generation rate.

4. The unmanned surface vehicle of claim 2, further comprising a pressure sensor and temperature sensor in communication with the control module, wherein the pressure sensor indicates a gas pressure of the at least one fuel-storage module and the temperature sensor indicates an internal temperature of the at least one fuel-storage module.

5. The unmanned surface vehicle of claim 4, wherein the control module monitors the pressure sensor and the temperature sensor, and wherein the control module deactivates the heater in response to determining at least one of the following:
   the gas pressure of the at least one fuel-storage module has reached a predefined limit, and
   the internal temperature of the at least one fuel-storage module is at a target temperature.

6. The unmanned surface vehicle of claim 1, wherein the fuel storage stores metal hydride, and wherein waste heat produced by the fuel cell stack is conducted by coolant flowing through the heat exchanger.

7. The unmanned surface vehicle of claim 6, wherein the coolant flowing through the heat exchanger circulates to the fuel storage to heat the metal hydride.

8. The unmanned surface vehicle of claim 1, wherein the heat exchanger draws waste heat from the fuel cell stack through the primary circuit.

9. The unmanned surface vehicle of claim 1, further comprising an air blower for cooling the fuel cell stack to a target stack temperature.

10. The unmanned surface vehicle of claim 9, further comprising a control module in communication with the air blower and a primary pump, wherein the primary pump circulates coolant flowing within the primary circuit between the fuel cell stack and the heat exchanger.

11. The unmanned surface vehicle of claim 10, wherein the control module executes instructions for:
    continuously monitoring power consumed by the air blower and power consumed by the primary pump;
    comparing the power consumed by the air blower to the power consumed by the primary pump; in response to determining the power consumed by the air blower is equal to or less than the power consumed by the primary pump, continuing to power the air blower to cool the fuel cell stack to the target stack temperature; and
    in response to determining the power consumed by the air blower is greater than the power consumed by the primary pump, reducing a speed of the air blower and activating the primary pump cool the fuel cell stack to the target stack temperature.

12. The unmanned surface vehicle of claim 1, further comprising a secondary pump that circulates the coolant in the secondary circuit.

13. The unmanned surface vehicle of claim 12, wherein the secondary pump is a variable displacement pump.

14. The unmanned surface vehicle of claim 1, further comprising a three-way valve fluidly connected to the heat exchanger.

15. The unmanned surface vehicle of claim 1, further comprising a three-way valve fluidly connected to the fuel storage.

16. A method of delivering fuel to and removing reaction waste heat from a fuel cell stack of a fuel cell by a fuel and thermal management system that is part of a power system for an unmanned surface vehicle, the method comprising:
    fluidly connecting a fuel storage including at least one fuel-storage module to a fuel inlet of the fuel cell stack of the fuel cell, wherein the at least one fuel-storage module is a source of energy for the fuel cell;
    removing the reaction waste heat produced by the fuel cell stack by a heat exchanger in thermal communication with the fuel cell stack;
    fluidly connecting the fuel storage to the fuel cell stack by a conduit, wherein a flow valve and a pressure regulator are both located along the conduit;
    circulating coolant by a primary circuit between the fuel cell stack and the heat exchanger and a secondary circuit between the fuel storage and the heat exchanger;
    opening a liquid valve in order to allow the coolant circulating in the secondary circuit to flow through a diverter conduit;

allowing the coolant flowing through the diverter conduit to flow to a water-cooled heat exchanger, wherein the water-cooled heat exchanger is cooled by a body of water the unmanned surface vehicle is deployed within; and delivering the fuel from the fuel storage to the fuel cell stack by the conduit.

17. The method of claim 16, further comprising:

activating, by a control module, a heater to warm a metal-hydride fuel-storage substrate of the fuel storage to a target temperature to achieve a target gaseous hydrogen fuel generation rate, wherein the heater is in thermal communication with and heats fuel contained within the fuel storage.

18. The method of claim 16, further comprising:

monitoring, by a control module, a pressure sensor and temperature sensor, wherein the pressure sensor indicates a gas pressure of the at least one fuel-storage module and the temperature sensor indicates an internal temperature of the at least one fuel-storage module.

19. The method of claim 18, wherein the fuel and thermal management system further comprises a heater in thermal communication with and heats fuel contained within the fuel storage, and wherein the method further comprises:

deactivating, by a control module, the heater in response to the control module determining at least one of the following:

the gas pressure of the at least one fuel-storage module has reached a predefined limit, and the internal temperature of the at least one fuel-storage module is at a target temperature.

20. The method of claim 16, further comprising an air blower for cooling the fuel cell stack to a target stack temperature, a control module, and a primary pump, wherein the control module is in communication with the air blower and the primary pump, and the primary pump circulates coolant flowing within the primary circuit between the fuel cell stack and the heat exchanger, and wherein the method further comprises:

continuously monitoring power consumed by the air blower and power consumed by the primary pump;

comparing the power consumed by the air blower to the power consumed by the primary pump;

in response to determining the power consumed by the air blower is equal to or less than the power consumed by the primary pump, continuing to power the air blower to cool the fuel cell stack to the target stack temperature; and in response to determining the power consumed by the air blower is greater than the power consumed by the primary pump, reducing a speed of the air blower and activating the primary pump cool the fuel cell stack to the target stack temperature.

* * * * *